United States Patent
Mikoshiba et al.

(10) Patent No.: US 6,756,488 B2
(45) Date of Patent: Jun. 29, 2004

(54) COMPOUND, DYE, INK AND INK-JET RECORDING METHOD

(75) Inventors: Hisashi Mikoshiba, Kanagawa (JP);
Tadashi Omatsu, Kanagawa (JP);
Makoto Suzuki, Kanagawa (JP);
Koushin Matsuoka, Kanagawa (JP);
Masuji Motoki, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/350,083

(22) Filed: Jan. 24, 2003

(65) Prior Publication Data

US 2003/0226221 A1 Dec. 11, 2003

Related U.S. Application Data

(62) Division of application No. 10/059,380, filed on Jan. 31, 2002, now Pat. No. 6,548,649.

(30) Foreign Application Priority Data

| Jan. 31, 2001 | (JP) | ......................................... 2001-24470 |
| Feb. 28, 2001 | (JP) | ......................................... 2001-54764 |
| Mar. 12, 2001 | (JP) | ......................................... 2001-69497 |
| Jan. 11, 2002 | (JP) | ......................................... 2002-5043 |
| Jan. 11, 2002 | (JP) | ......................................... 2002-5044 |

(51) Int. Cl.[7] .......................... C09B 33/10; C09D 11/02
(52) U.S. Cl. .................... 534/755; 534/757; 106/31.45; 106/31.48; 106/31.5
(58) Field of Search ................................ 534/755, 757; 106/31.45, 31.48, 31.5

(56) References Cited

U.S. PATENT DOCUMENTS

| 2,346,531 A | * | 4/1944 | Allen et al. ................. 534/757 |
| 3,221,005 A | * | 11/1965 | Moore et al. ................ 534/757 |
| 5,779,780 A | | 7/1998 | Gregory et al. |
| 5,929,217 A | | 7/1999 | Patsch et al. |

FOREIGN PATENT DOCUMENTS

| DE | 35 12836 A1 | 10/1985 |
| GB | 2 251 625 A | 7/1992 |
| PL | 163595 B1 | 9/1989 |
| SU | 1675308 A1 | 9/1991 |

OTHER PUBLICATIONS

Barsac et al., Chemical Abstracts, 65:29891, 1966.*
A. Labudzinska et al., "Studies of the carbazole azo dyes by means of UV/VIS spectroscopy", Elsevier Science Publishers B.V., Amsterdam, *Journal of Molecular Structure*, 294 (1993) pp. 247–250.
V.I. Shishkina et al., "Structure and chemical conversions of carbazole and its derivatives, XXVI. Substantiveness of azo dyes based on 3–amino– and 3,6–diaminocarbazole", Ural. politekh. Inst. im Kirova, Sverdlovsk, USSR, *Izv. Vyssh. Ucheb. Zaved., Khim. Khim. Tekhnol.*, (1969), 12(3), pp. 365–367 (with English abstract).
EPO Search Report dated May 10, 2002 in EP Application No. 02 00 2270.3.
V. M. Vasic et al, "Equilibria of Palladium(II) Reactions with Some Pyrazole– and Imidazole–Azochromotropic Acid Derivatives", *Polyhedron*, vol. 11, No. 13, pp. 1597–1600 (1992).
S. B. Savin et al, "On a New Organic Reagent for Determining Zinc", *V. I. Vernadsky Institute of Geochemistry and Analytical Chemistry*, USSR Academy of Sciences, Moscow, vol. XXVII, pp. 2354–2357 (1972) (with English abstract).
EPO Search Report dated Jul. 5, 2002 in EP Application No. 02 00 2270.3.

* cited by examiner

*Primary Examiner*—Flona T. Powers
(74) *Attorney, Agent, or Firm*—Burns, Doane, Swecker & Mathis, L.L.P.

(57) ABSTRACT

A compound which can be used as a dye and is represented by the following general formulae (I), (II) and (III). In the general formulae, A and B each independently represents a monovalent heterocyclic group bonded to an azo group by a carbon atom of the monovalent heterocyclic group; m and n each independently represents one of 0 and 1; and M represents one of a hydrogen atom and a monovalent positive ion.

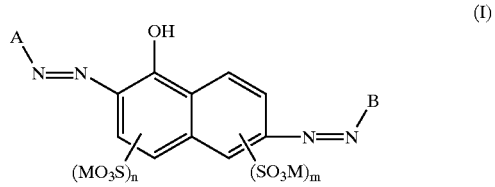

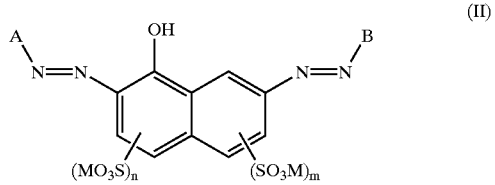

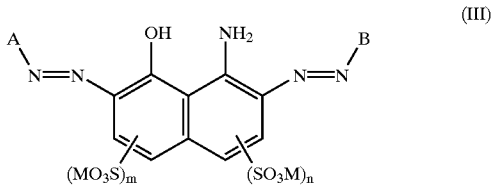

5 Claims, 8 Drawing Sheets

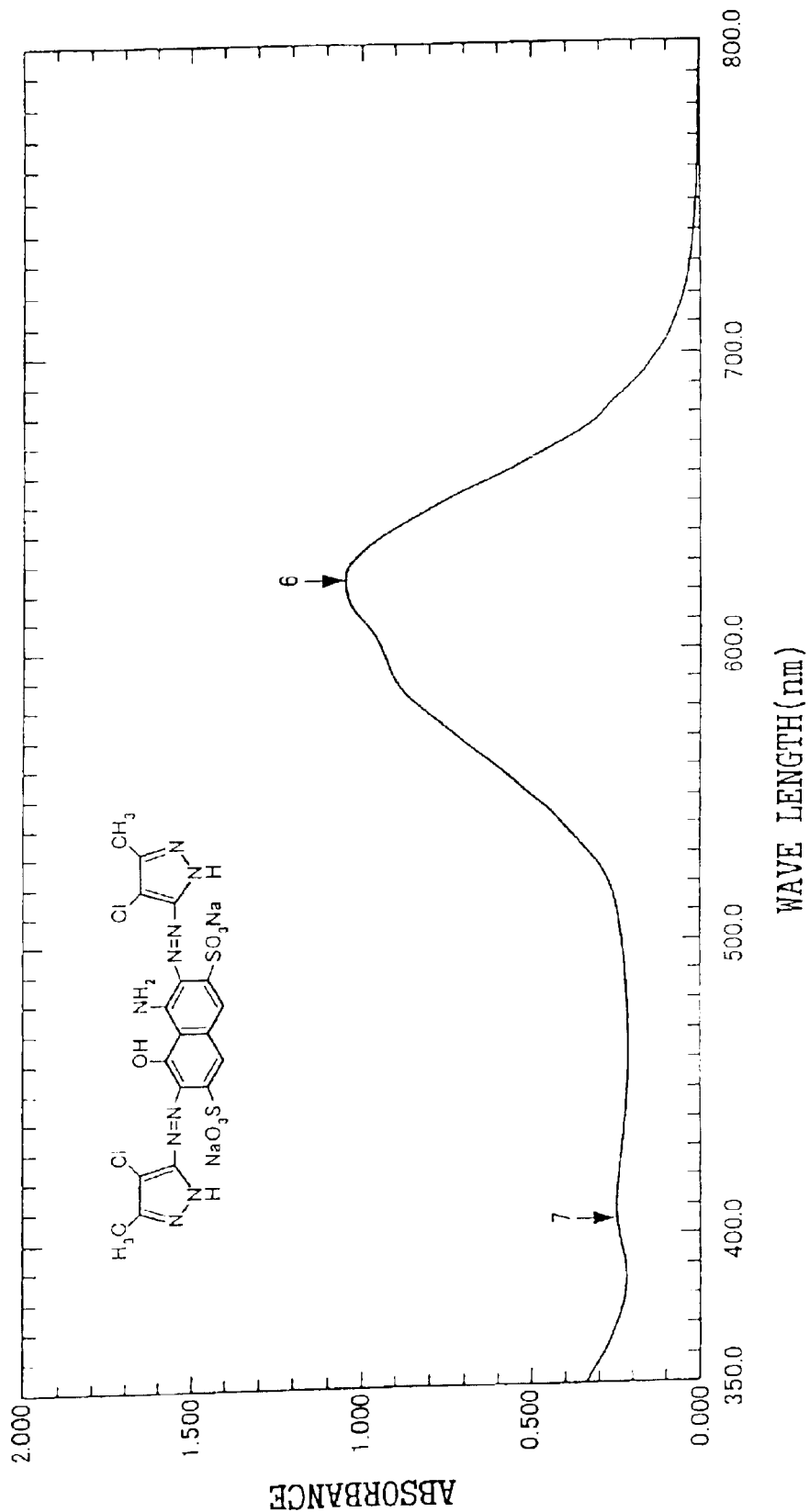

COMPOUND, DYE, INK AND INK-JET RECORDING METHOD

This application is a divisional of application Ser. No. 10/059,380, filed on Jan. 31, 2002, now U.S. Pat. No. 6,548,649, the entire contents of which are incorporated by reference herein.

BACKGROUND OF THE INVENTION

1. Field of the Invention

The present invention relates to an improved compound of a bis-type azo dye which presents a black color, dye which comprises the compound, an ink, a jet printing ink which comprises the dyes, and an ink-jet recording method using the ink.

2. Description of the Related Art

Dyes which present a black color are used not only for the purpose of printing character information, but also as a black print dye in color image printing. However, development of dyes which present a neutral black color is often technically difficult. Although researches and development for the dye has been extensively carried out, there are few dyes having satisfactory properties under the existing circumstances.

For this reason, a method has been carried out, wherein plural dyes having various types of hues are mixed to form the black color. The development of dyes which can present high-density and neutral black color by itself is the technical subject which has been presently demanded most strongly.

With the spread of ink jet printers in recent years, black dyes have become more important than before. In the ink jet printers, printing based on character (letter) information is carried out at an extremely high frequency compared with a pictorial printer of another type. Accordingly, there exits a problem that black dyes used by the ink-jet printers must satisfy conditions which are required both in a case in which the dyes are used for a black image portion of image information and in a case in which the dyes are used for a portion of character information.

The above black dyes must satisfy the following required conditions. For example, they must present a high-density and neutral black color, and they must be excellent in adaptability for ink and ink stability. It is also necessary for the dyes to have high image fastness (that is, high resistance against light, heat, atmospheric moisture, chemicals, air, various gases in the atmosphere, water and friction). Further, they must cause a little variation in hues due to a printing medium (paper), and they must have excellent dyeing properties on image receiving paper. They are furthermore required to be easily synthesized, to be available at a low cost, and to do no harm to living creatures.

Although bis-type azo dyes have been proposed as the block dyes, dyes in which partial structures corresponding to A and B in general formulae (I), (II) and (III) according to the present invention are both heterocycles, have not been known with a few exceptions. Publicly known bis-azo type black dyes have problems that they have a low density (resulting from that a molecular extinction coefficient of the dyes, which is a basic physical property value of dyes, is low), does not have a hue of neutral black (the absorption waveform is broad and light in a visible region is uniformly absorbed), and are deteriorated in image fastness.

Further, some of the black dyes may have a structure in which a harmful chrome ion exists in a molecule, which becomes a problem in the safety to living creatures.

SUMMARY OF THE INVENTION

The present invention has been devised in order to solve the above-described problems in the conventional techniques and achieve the following objects.

That is, an object of the present invention is to provide an improved compound which presents a high-density and neutral black color having no other color tint and satisfies various conditions required by dyes, ink and jet printing ink, and which is available at a low cost and easily synthesized.

Further, another object of the present invention is to provide improved dye containing the improved compound, which have excellent printing properties and favorable color tone, have a low degree of dependence on paper, cause no blurring, have excellent water resistance and image storability (for example, light resistance, dark heat storability, and ozone resistance), and present a high-density black color, and also provide an ink and a jet printing ink containing the dyes.

Moreover, still another object of the present invention is to provide an ink-jet recording method in which a black image having excellent image properties is provided by using the jet printing ink.

As a result of their investigations into a bis-type azo dye having a heterocyclic structure which is an improved structure conventionally unknown, the present inventors strove to develop an improved compound which exhibits excellent properties as a black dye, a dye containing the compound, an ink, a jet printing ink containing the dyes, and an ink-jet recording method using the jet printing ink, and has completed the present invention.

The means for solving the above-described objects will be described hereinafter.

A first aspect of the present invention is a compound represented by the following general formula (I).

General formula (I)

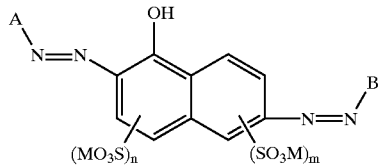

In the formula, A and B each independently represents a monovalent heterocyclic group bonded to an azo group by a carbon atom of the monovalent heterocyclic group; m and n each independently represents one of 0 and 1; and M represents one of a hydrogen atom and a monovalent positive ion.

A second aspect of the present invention is a compound represented by the following general formula (II).

General formula (II)

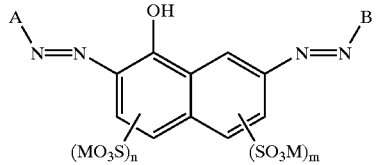

In the formula, A and B each independently represents a monovalent heterocyclic group bonded to an azo group by a carbon atom of the monovalent heterocyclic group; m and n each independently represents one of 0 and 1; M represents one of a hydrogen atom and a monovalent positive ion, which A and B are not both 1H-pyrazole-3-yl at the same time.

A third aspect of the present invention is a compound represented the following general formula (III).

General formula (III)

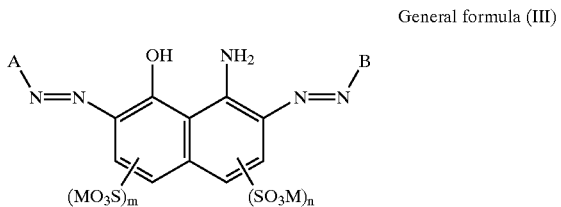

In the formula, A and B each independently represents a monovalent heterocyclic group bonded to an azo group by a carbon atom of the monovalent heterocyclic group; m and n each independently represents one of 0 and 1; and M represents one of a hydrogen atom and a monovalent positive ion.

A further aspects of the present invention are a dye containing at least one of the above compounds, an ink, a jet printing ink containing the dyes, and an ink-jet recording method in which recording is carried out using the ink.

BRIEF DESCRIPTION OF THE DRAWINGS

FIG. 8 is a figure showing a measurement result of an absorption spectrum of compound III-26 (dye III-26) in dimethylformamide.

DESCRIPTION OF THE PREFERRED EMBODIMENTS

Figure 1:
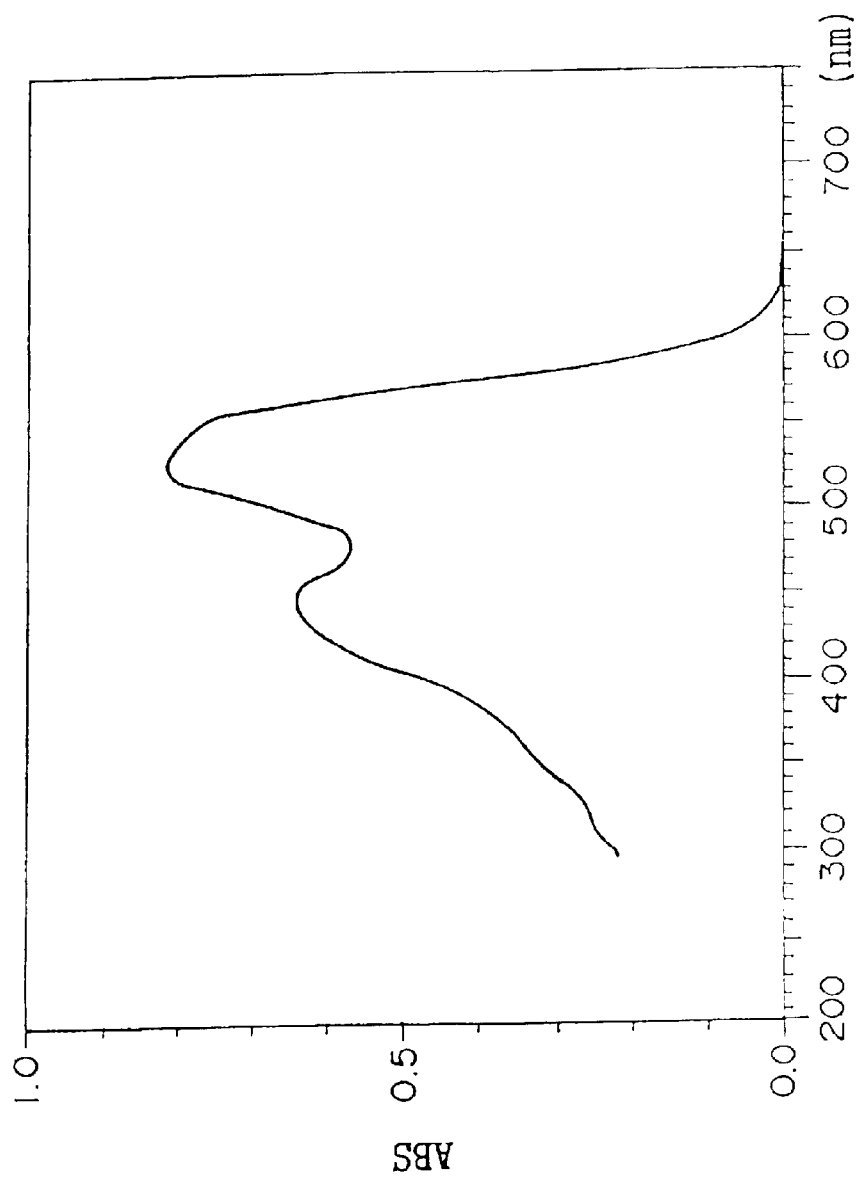
FIG. 1 is a figure showing a measurement result of absorption spectrum of a solution containing a compound I-23 of the present invention (the ratio of dimethylformamide to water is 1 to 1; volume ratio).

A description will be hereinafter given of an improved compound, dyes, ink, jet printing ink and ink-jet recording method of the present invention in detail. First, the improved compound of the present invention will be described.
[Improved Compound]

The improved compounds of the present invention are represented by the general formulae (1), (II) and (III) described above.

In these general formulae, the monovalent heterocyclic group represented by A is preferably a 5- or 6-membered heterocyclic ring having therein at least one kind of heteroatom selected from an oxygen atom, a sulfur atom, and a nitrogen atom. Among them, an aromatic heterocyclic ring is more preferable, and a heterocyclic ring having 2 to 30 carbon atoms is further preferable.

The monovalent heterocyclic group represented by A may be further condensed by a different ring. Among condensed rings, a 5- or 6-membered ring condensed by a different ring is preferable.

The monovalent heterocyclic group represented by A is preferably a diazo compound or derived from a diazo compound.

The diazo component mentioned herein means a partial structure in which a heterocyclic compound having an amino group as a substituent, is transformed into a diazo compound and introduced by being subjected to a diazo coupling reaction on a coupler. This is the concept used frequently in the field of azo dyes.

In other words, the aforementioned heterocyclic group is a substituent which is a monovalent group obtained by removing an amino group from an amino-substituted heterocyclic compound which allows a diazotization reaction.

The monovalent heterocyclic group represented by B preferably comprises a 5- or 6-membered heterocyclic ring having therein at least one kind of heteroatom selected from an oxygen atom, a sulfur atom, and a nitrogen atom. Among them, an aromatic heterocyclic ring is more preferable, and a heterocyclic ring having 2 to 30 carbon atoms is further preferable.

The monovalent heterocyclic group represented by B may be further condensed by a different ring. Among condensed rings, a 5- or 6-membered ring condensed by a different ring is preferable.

The above-described monovalent heterocyclic group represented by B is preferably a coupler component or derived from a coupler compound.

The coupler component mentioned herein means a partial structure derived from a coupler compound which reacts on diazonium salt and provides an azo dye. This is the concept frequently used in the field of azo dyes.

In the general formulae (I), (II) and (III), the heterocyclic groups represented by A and B each may further have at least one of a substituent. In this case, the substituent may be preferably selected from the following examples.

Examples of the substituent include a halogen atom, an alkyl group (containing a cycloalkyl group and a bicycloalkyl group), an alkenyl group (containing a cycloalkenyl group and a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (containing an anilino group), an acylamino group, an aminocarbonylamino group, an alkoxycarbonylamino group, an aryloxycarbonylamino group, a sulfamoylamino group, alkyl and aryl sulfonylamino group, a mercapto group, an alkyl thio group, an aryl thio group, a heterocyclic thio group, a sulfamoyl group, a sulfo group, alkyl and aryl sulfinyl groups, alkyl and aryl sulfonyl groups, an acyl group, an aryloxycarbonyl group, an alkoxycarbonyl group, a carbamoyl group, aryl and heterocyclic azo groups, an imide group, a phosphino group, a phosphinyl group, a phosphinyloxy group, a phosphinylamino group and a silyl group.

Examples of the above halogen atom include chlorine, bromine and iodine.

Examples of the above alkyl group include a substituted or unsubstituted straight-chain, branched or cyclic alkyl group, and also include a cycloalkyl group, a bicycloalkyl group and a tricyclo structure having many rings.

The above alkyl group is preferably an alkyl group having 1 to 30 carbon atoms (for example, a methyl group, an ethyl group, n-propyl group, an isopropyl group, t-butyl group, n-octyl group, an eicosyl group, 2-chloroethyl group, 2-cyanoethyl group or 2-ethylhexyl group).

The above cycloalkyl group is preferably a substituted or unsubstituted cycloalkyl group having 3 to 30 carbon atoms (for example, a cyclohexyl group, a cyclopentyl group and a 4-n-dodecylcyclohexyl group).

The above bicycloalkyl group is preferably a substituted or unsubstituted bicycloalkyl group having 5 to 30 carbon atoms, that is, a monovalent group obtained by removing one hydrogen atom from bicycloalkane having 5 to 30 carbon atoms (for example, bicyclo[1,2,2]heptane-2-yl, bicyclo[2,2,2]octane-3-yl group).

The alkyl group in the substituent (for example, an alkyl group of an alkylthio group), which will be described later, also represents the alkyl group having the above concept.

Examples of the above alkenyl group include a substituted or unsubstituted straight-chain, branched or cyclic alkyenyl group, and also include a cycloalkenyl group and a bicycloalkenyl group.

The above alkenyl group is preferably a substituted or unsubstituted alkenyl group having 2 to 30 carbon atoms (for example, a vinyl group, an allyl group, a prenyl group, a geranyl group and an oleyl group).

The above cycloalkenyl group is preferably a substituted or unsubstituted cycloalkenyl group having 3 to 30 carbon atoms, that is, a monovalent group obtained by removing one hydrogen atom from cycloalkene having 3 to 30 carbon atoms (for example, 2-cyclopentene-1-yl group, or 2-cyclohexene-1-yl group).

The above bicycloalkenyl group may be a substituted or unsubstituted bicycloalkenyl group. A substituted or unsubstituted bicycloalkenyl group having 5 to 30 carbon atoms, that is, a monovalent group obtained by removing one hydrogen atom from a bicycloalkene having one double bond (for example, bicyclo[2,2,1]hepto-2-en-1-yl group, bicyclo[2,2,2]octo-2-en-4-yl group) is particularly preferable.

The above alkynyl group is preferably a substituted or unsubstituted alkynyl group having 2 to 30 carbon atoms. For example, an ethynyl group, a propargyl group and a trimethylsilylethynyl group are particularly preferable.

The above aryl group is preferably a substituted or unsubstituted aryl group having 6 to 30 carbon atoms. For example, a phenyl group, a p-tolyl group, a naphthyl group, an m-chlorophenyl group and an o-hexadecanoylaminophenyl group are particularly preferable.

Among the above heterocyclic groups, a monovalent group obtained by removing one hydrogen atom from a 5- or 6-membered substituted or unsubstituted aromatic or non-aromatic heterocyclic compound is preferably, and a 5- or 6-membered aromatic heterocyclic group having 3 to 30 carbon atoms is more preferable. For example, a 2-furyl group, a 2-thienyl group, a 2-pyrimidinyl group and a 2-benzothiazolyl group are particularly preferable.

The above alkoxy group is preferably a substituted or unsubstituted alkoxy group having 1 to 30 carbon atoms. For example, a methoxy group, an ethoxy group, an isopropoxy group, t-butoxy group, n-octyloxy group and 2-methoxyethoxy group are more preferable.

The above aryloxy group is preferably a substituted or unsubstituted aryloxy group having 6 to 30 carbon atoms. For example, a phenoxy group, 2-methylphenoxy group, 4-t-butylphenoxy group, 3-nitrophenoxy group and 2-tetradecanoylaminophenoxy group are more preferable.

The above silyloxy group is preferably a silyloxy group having 3 to 20 carbon atoms. For example, a trimethylsilyloxy group and t-butyldimethylsilyloxy group are more preferable.

The above heterocyclic oxy group is preferably a substituted or unsubstituted heterocyclic oxy group having 2 to 30 carbon atoms. For example, 1-phenyltetrazole-5-oxy group and 2-tetrahydropyranyloxy group are more preferable.

The above acyloxy group is preferably a formyloxy group, a substituted or unsubstituted alkylcarbonyloxy group having 2 to 30 carbon atoms, a substituted or unsubstituted arylcarbonyloxy group having 6 to 30 carbon atoms, or the like. For example, a formyloxy group, an acetyloxy group, a pivaloyloxy group, a stearolyloxy group, a benzoyloxy group and p-methoxyphenylcarbonyloxy group are more preferable.

The above carbamoyloxy group is preferably a substituted or unsubstituted carbamoyloxy group having 1 to 30 carbon atoms. For example, N,N-dimethylcarbamoyloxy group, N,N-diethylcarbamoyloxy group, morpholinocarbonyloxy group, N,N-di-n-octylaminocarbonyloxy group and N-n-octylcarbamoyloxy group are more preferable.

The above alkoxycarbonyloxy group is preferably a substituted or unsubstituted alkoxycarbonyloxy group having 2 to 30 carbon atoms. For example, a methoxycarbonyloxy group, an ethoxycarbonyloxy group, t-butoxycarbonyloxy group, and n-octylcarbonyloxy group are more preferable.

The above aryloxycarbonyloxy group is preferably a substituted or unsubstitued aryloxycarbonyloxy group having 7 to 30 carbon atoms. For example, a phenoxycarbonyloxy group, p-methoxyphenoxycarbonyloxy group, and p-n-hexadecyloxyphenoxycarbonyloxy group are more preferable.

The above amino group may be a substituted or unsubstituted alkylamino group having 1 to 30 carbon atoms, a substituted or unsubstituted anilino group having 6 to 30 carbon atoms, and the like. For example, an amino group, a methylamino group, a dimethylamino group, an anilino group, N-methyl-anilino group and a diphenylamino group are particularly preferable.

The above acylamino group is preferably a formylamino group, a substituted or unsubstituted alkylcarbonylamino group having 1 to 30 carbon atoms, a substituted or unsubstituted arylcarbonylamino group having 6 to 30 carbon atoms and the like. For example, a formylamino group, an acetylamino group, a pivaloylamino group, a lauroylamino group, a benzoylamino group and 3,4,5-tri-n-octyloxyphenylcarbonylamino group are more preferable.

The above aminocarbonylamino group is preferably a substituted or unsubstituted aminocarbonylamino group having 1 to 30 carbon atoms. For example, a carbamoylamino group, N,N-dimethylaminocarbonylamino group, N,N-diethylaminocarbonylamino group and morpholinocarbonylamino group are more preferable.

The above alkoxycarbonylamino group is preferably a substituted or unsubstituted alkoxycarbonylamino group having 2 to 30 carbon atoms. For example, methoxycarbonylamino group, ethoxycarbonylamino group, t-butoxycarbonylamino group, n-octadecyloxycarbonylamino group and N-methyl-methoxycarbonylamino group are more preferable The above aryloxycarbonylamino group is preferably a substituted or unsubstituted aryloxycarbonylamino group having 7 to 30 carbon atoms. For example, phenoxycarbonylamino group, p-chlorophenoxycarbonylamino group, m-n-octyloxyphenoxycarbonylamino group are more preferable.

The above sulfamoylamino group is preferably a substituted or unsubstituted sulfamoylamino group having 0 to 30 carbon atoms. For example, a sulfamoylamino group, N,N-dimethylaminosulfonylamino group and N-n-octylaminosulfonylamino group are more preferable.

Among the above alkyl and aryl sulfonylamino groups, a substituted or unsubstituted alkylsulfonylamino group having 1 to 30 carbon atoms, a substituted or unsubstituted arylsulfonylamino group having 6 to 30 carbon atoms, and the like. For example, a methylsulfonylamino group, a butylsulfonylamino group, a phenylsulfonylamino group, 2,3,5-trichlorophenylsulfonylamino group, and p-methylphenylsulfonylamino group are more preferable.

The above alkylthio group is preferably a substituted or unsubstituted alkylthio group having 1 to 30 carbon atoms. For example, methylthio group, ethylthio group and n-hexadecylthio group are more preferable.

The above arylthio group is preferably a substituted or unsubstituted arylthio group having 6 to 30 carbon atoms. For example, phenylthio group, p-chlorophenylthio group and m-methoxyphenylthio group are more preferable The above heterocyclic thio group is preferably a substituted or unsubstituted heterocyclic thio group having 2 to 30 carbon atoms. For example, 2-benzothiazolylthio group and 1-phenyltetrazole-5-ylthio group are more preferable.

The above sulfamoyl group is preferably a substituted or unsubstituted sulfamoyl group having 0 to 30 carbon atoms. For example, N-ethylsulfamoyl group, N-(3-dodecyloxypropyl)sulfamoyl group, N,N-dimethylsulfamoyl group, N-acetylsulfamoyl group, N-benzoylsulfamoyl group, and N-(N'-phenylcarbamoyl) sulfamoyl group are more preferable.

Among the above alkyl- and aryl-sulfinyl groups, a substituted or unsubstituted alkylsulfinyl group having 1 to 30 carbon atoms, a substituted or unsubstituted arylsulfinyl group having 6 to 30 carbon atoms and the like are preferable. For example, methylsulfinyl group, ethylsulfinyl group, phenylsulfinyl group and p-methylphenylsulfinyl group are more preferable.

Among the alkyl- and aryl-sulfonyl groups, a substituted or unsubstituted alkylsulfonyl group having 1 to 30 carbon atoms, a substituted or unsubstituted arylsulfonyl group having 6 to 30 carbon atoms, and the like are preferable. For example, a methylsulfonyl group, an ethylsulfonyl group, a phenylsulfonyl group and p-methylphenylsulfonyl group are more preferable.

The above acyl group is preferably a formyl group, a substituted or unsubstituted alkylcarbonyl group having 2 to 30 carbon atoms, a substituted or unsubstituted arylcarbonyl group having 7 to 30 carbon atoms and the like. For example, an acetyl group, a pivaloyl group, 2-chloroacetyl group, a stearoyl group, a benzoyl group, and p-n-octyloxyphenylcarbonyl group are more preferable.

The above aryloxycarbonyl group is preferably a substituted or unsubstituted aryloxycarbonyl group having 7 to 30 carbon atoms. For example, a phenoxycarbonyl group, o-chlorophenoxycarbonyl group, m-nitrophenoxycarbonyl group and p-t-butylphenoxycarbonyl group are more preferable.

The above alkoxycarbonyl group is preferably a substituted or unsubstituted alkoxycarbonyl group having 2 to 30 carbon atoms. For example, a methoxycarbonyl group, an ethoxycarbonyl group, t-butoxycarbonyl group and n-octadecyloxycarbonyl group are more preferable.

The above carbamoyl group is preferably a substituted or unsubstituted carbamoyl group having 1 to 30 carbon atoms. For example, a carbamoyl group, N-methylcarbamoyl group, N,N-dimethylcarbamoyl group, N,N-di-n-octylcarbamoyl group and N-(methylsulfonyl)carbamoyl group are more preferable.

Among the aryl and heterocyclic azo groups, a substituted or unsubstituted arylazo group having 6 to 30 carbon atoms, a substituted or unsubstituted heterocyclic azo group having 3 to 30 carbon atoms and the like are preferable. For example, a phenylazo group, p-chlorophenylazo group and 5-ethylthio-1,3,4-thiadiazole-2-ylazo group are more preferable.

Preferred examples of the above imide group include N-succinimide, N-phthalimide and the like.

The above phosphino group is preferably a substituted or unsubstituted phosphino group having 2 to 30 carbon atoms. For example, a dimethylphosphino group, a diphenylphosphino group, and a methylphenoxyphosphino group are more preferable.

The above phosphinyl group is preferably a substituted or unsubstituted phosphinyl group having 2 to 30 carbon atoms. For example, a phosphinyl group, a dioctyloxyphosphinyl group and a diethoxyphosphinyl group are more preferable.

The above phosphinyloxy group is preferably a substituted or unsubstituted phosphinyloxy group having 2 to 30 carbon atoms. For example, a diphenoxyphosphinyloxy group and a dioctyloxyphosphinyloxy group are more preferable.

The above phosphinylamino group is preferably a substituted or unsubstituted phosphinylamino group having 2 to 30 carbon atoms. For example, a dimethoxyphosphinylamino group and a dimethylaminophosphinylamino group are more preferable.

The above silyl group is preferably a substituted or unsubstituted silyl group having 3 to 30 carbon atoms. For example, a trimethylsilyl group, t-butyldimethylsilyl group and a phenyldimethylsilyl group are more preferable.

A substituent of the heterocyclic group having a hydrogen atom may be further substituted by the aforementioned substituent by removing the hydrogen atom therefrom.

Preferred examples of the substituent include an alkylcarbonylaminosulfonyl group, an arylcarbonylaminosulfonyl group, an alkylsulfonylaminocarbonyl group and an arylsulfonylaminocarbonyl group. Among them, a methylsulfonylaminocarbonyl group, p-methylphenylsulfonylaminocarbonyl group, an acetylaminosulfonyl group and a benzoylaminosulfonyl group are more preferable.

In the above general formulae (I), (II) and (III), specific examples of the monovalent heterocyclic group represented by A and B and bonded to an azo group by a carbon atom thereof will be shown below, but the present invention is not limited to the same.

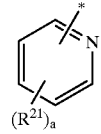

(A-1)

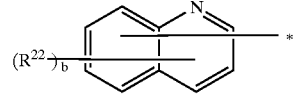

(A-2)

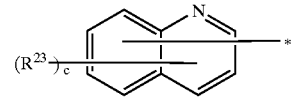

(A-3)

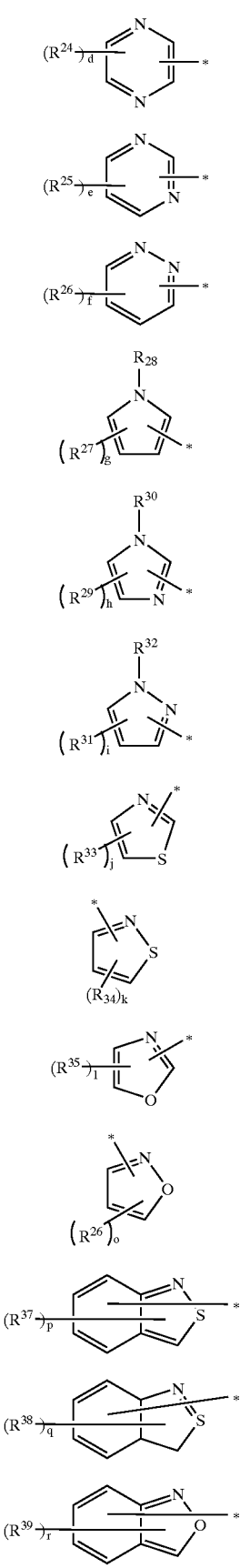
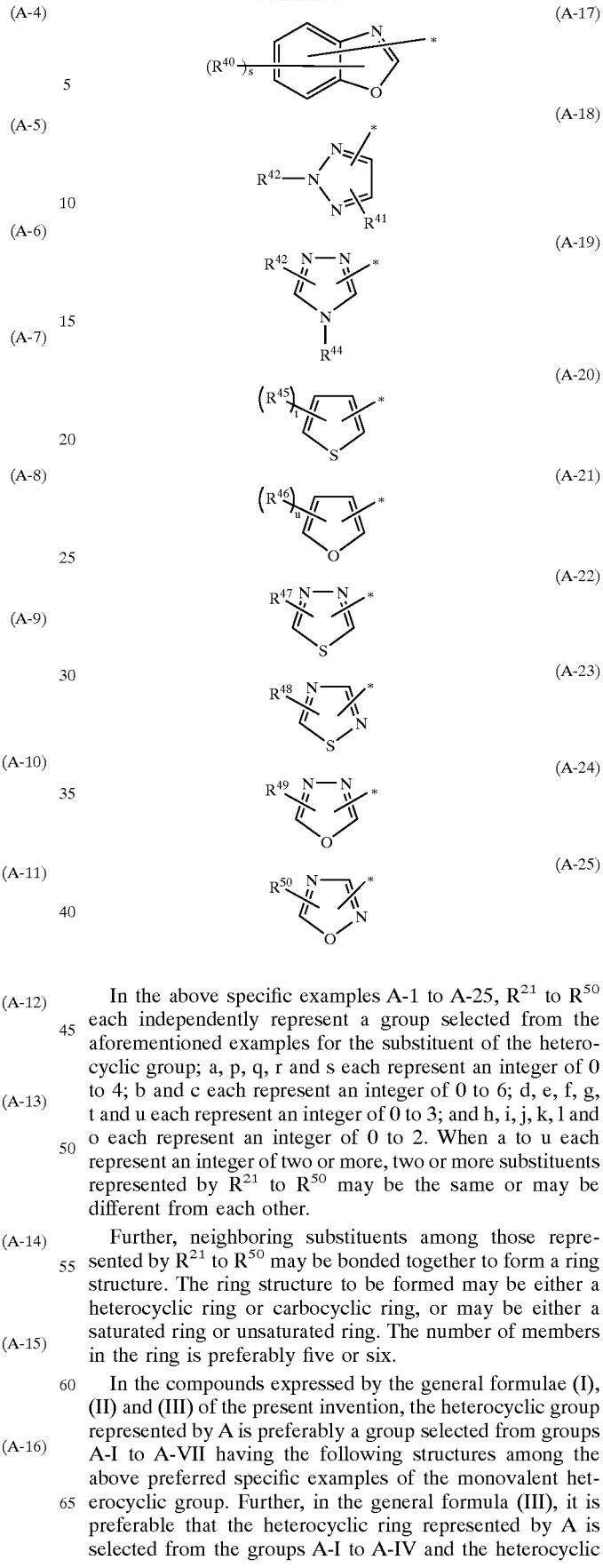

In the above specific examples A-1 to A-25, $R^{21}$ to $R^{50}$ each independently represent a group selected from the aforementioned examples for the substituent of the heterocyclic group; a, p, q, r and s each represent an integer of 0 to 4; b and c each represent an integer of 0 to 6; d, e, f, g, t and u each represent an integer of 0 to 3; and h, i, j, k, l and o each represent an integer of 0 to 2. When a to u each represent an integer of two or more, two or more substituents represented by $R^{21}$ to $R^{50}$ may be the same or may be different from each other.

Further, neighboring substituents among those represented by $R^{21}$ to $R^{50}$ may be bonded together to form a ring structure. The ring structure to be formed may be either a heterocyclic ring or carbocyclic ring, or may be either a saturated ring or unsaturated ring. The number of members in the ring is preferably five or six.

In the compounds expressed by the general formulae (I), (II) and (III) of the present invention, the heterocyclic group represented by A is preferably a group selected from groups A-I to A-VII having the following structures among the above preferred specific examples of the monovalent heterocyclic group. Further, in the general formula (III), it is preferable that the heterocyclic ring represented by A is selected from the groups A-I to A-IV and the heterocyclic ring represented by B is selected from the groups A-V to A-VII.

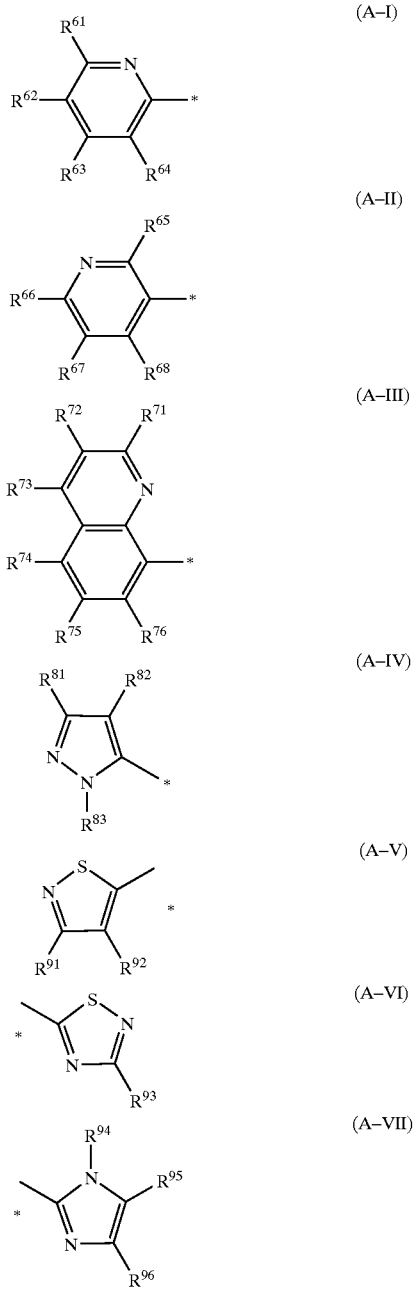

In the preferred specific examples A-I to A-VII of the heterocyclic group represented by A, $R^{61}$, $R^{62}$, $R^{63}$, $R^{64}$, $R^{65}$, $R^{66}$, $R^{67}$, $R^{68}$, $R^{71}$, $R^{72}$, $R^{73}$, $R^{74}$, $R^{75}$, $R^{76}$, $R^{81}$, $R^{82}$, $R^{83}$, $R^{91}$, $R^{92}$, $R^{93}$, $R^{94}$, $R^{95}$ and $R^{96}$ each independently represent a hydrogen atom or a substituent. Examples of the substituent are the same as those described above for the substituent of the heterocyclic group.

Among the aforementioned substituents, $R^{91}$ and $R^{92}$ are preferably substituents which are bonded to each other to form a 5- or 6-membered ring structure. This ring structure to be formed is more preferably a benzene ring. The benzene ring may have a substituent. Examples of the substituent are the same as those described above for the substituent of the heterocyclic group. Among them, a sulfonic acid group (or sulfonate) is preferable.

$R^{93}$ is preferably a nitro group, an alkylsulfonyl group, an arylsulfonyl group, an alkylthio group, an arylthio group, an alkyl group or an aryl group among the aforementioned examples of the substituent.

$R^{95}$ and $R^{96}$ are each preferably a carboxyl group, an alkoxycarbonyl group, an aminocarbonyl group, a cyano group, an alkyl group or an aryl group among the aforementioned examples of the substituent.

$R^{94}$ is preferably a hydrogen atom, an alkyl group or an aryl group among the aforementioned examples of the substituent.

$R^{61}$, $R^{62}$, $R^{63}$, $R^{64}$, $R^{65}$, $R^{66}$, $R^{67}$, $R^{68}$, $R^{71}$, $R^{72}$, $R^{73}$, $R^{74}$, $R^{75}$ and $R^{76}$ are preferably each independently a hydrogen atom, a chlorine atom, a sulfonic acid group, a carboxylic acid group, an alkyl group, an azo group, an alkylsulfonyl group or a nitro group among the aforementioned examples of the substituent.

$R^{81}$ is preferably an alkyl group, an aryl group, a cyano group, a carboxylic acid group, an alkoxycarbonyl group, an aryloxycarbonyl group or an acyl group among the aforementioned examples of the substituent.

$R^{82}$ is preferably an alkyl group, an aryl group, a cyano group, a carboxylic acid group, an alkoxycarbonyl group or an aryloxycarbonyl group among the aforementioned examples of the substituent.

$R^{83}$ is preferably a hydrogen atom, an alkyl group, an aryl group or a heterocyclic group among the aforementioned examples of the substituent.

Further, in the compounds represented by the general formulae (I), (II) and (III) of the present invention, the heterocyclic ring represented by B is preferably a group selected from the groups B-I to B-VII having the following structures among the aforementioned preferred specific examples of the monovalent heterocyclic group.

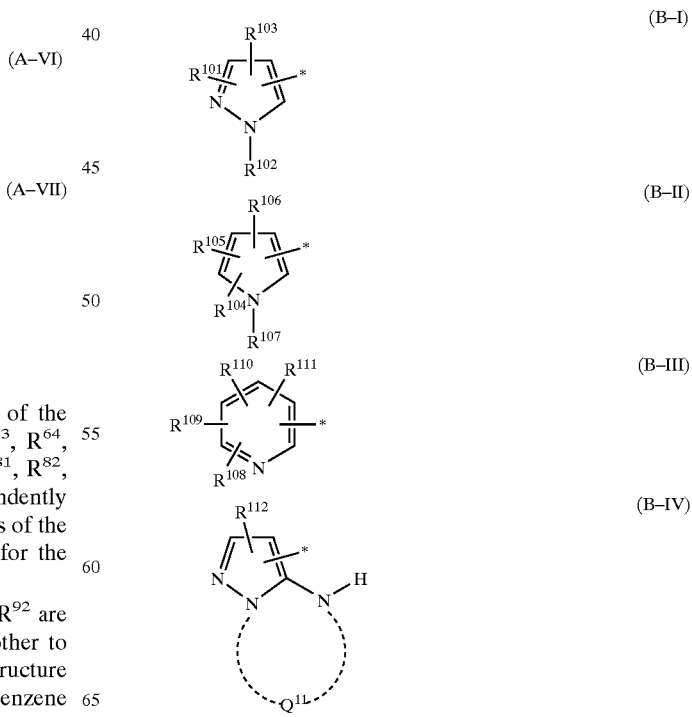

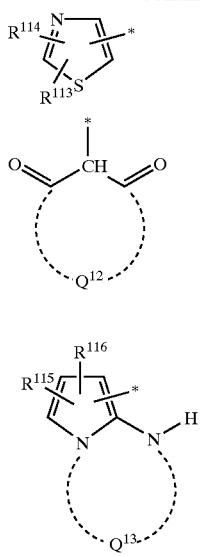
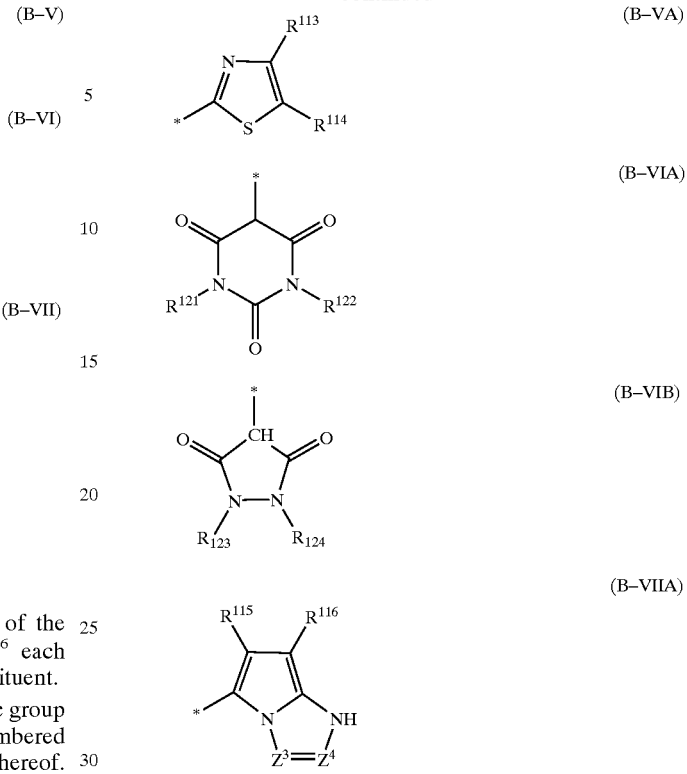

In the preferred specific examples B-I to B-VII of the heterocyclic group represented by B, $R^{101}$ to $R^{116}$ each independently represent a hydrogen atom or a substituent.

Further, $Q^{11}$, $Q^{12}$ and $Q^{13}$ each represent an atomic group of atoms which are required for forming a 5- or 6-membered heterocyclic ring together with N atoms at both ends thereof.

Among the preferred specific examples B-I to B-VII of the heterocyclic group represented by B as well, groups having structures represented by the following chemical formulae B-IA, B-IIA, B-IIIA, B-IVA, B-VA, B-VIA, B-VIB and B-VIIA are more preferable.

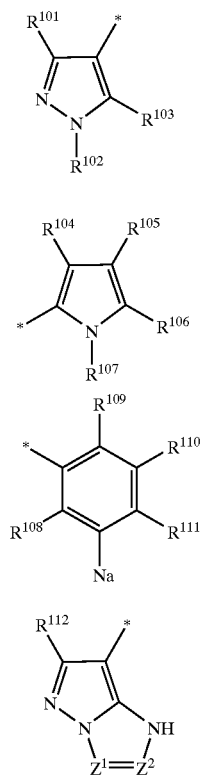

In the further preferred specific examples of the heterocyclic group represented by B, $R^{101}$ to $R^{116}$ and $R^{121}$ to $R^{124}$ each represent a hydrogen atom or a substituent. Examples of the substituent can include the aforementioned examples of the substituent by which the heterocyclic rings represented by A and B is substitutable.

$R^{101}$ and $R^{102}$ are preferably a substituted or unsubstituted alkyl group and a substituted or unsubstituted aryl group, respectively, and more preferably an unsubstituted alkyl group having 1 to 30 carbon atoms and a substituted or unsubstituted aryl group having 6 to 30 carbon atoms, respectively.

$R^{101}$ represents an unsubstituted alkyl group having 1 to 30 carbon atoms. It is particularly also preferable that $R^{102}$ represents a substituted or unsubstituted aryl group having 6 to 30 carbon atoms.

$R^{103}$ preferably represents a hydroxyl group or an amino group.

$R^{104}$, $R^{105}$ and $R^{107}$ are each preferably the same as $R^{102}$. $R^{106}$ is preferably a hydroxyl group, or a substituted or unsubstituted amino group. In a case in which $R^{106}$ is an amino group, an amino group substituted by an alkyl group having 1 to 30 carbon atoms, or an amino group substituted by an aryl group having 6 to 30 carbon atoms are more preferable.

$R^{108}$ and $R^{111}$ are each preferably a hydroxyl group, or a substituted or unsubstituted amino group.

$R^{109}$ is preferably a substituted or unsubstituted alkyl group, or a substituted or unsubstituted aryl group. Among them, an unsubstituted alkyl group having 1 to 22 carbon atoms is more preferable.

$R^{110}$ is preferably a cyano group, a carboxyl group, or a substituted or unsubstituted aminocarbonyl group. Among them, a cyano group is particularly preferable.

$R^{112}$ is preferably a substituted or unsubstituted alkyl group, or a substituted or unsubstituted aryl group. Among them, an unsubstituted alkyl group having 1 to 8 carbon atoms is particularly preferable.

$Z^1$ and $Z^2$ each independently represent —$C(R^{126})$=, or —N=. $R^{126}$ represents a substituted or unsubstituted alkyl group, or a substituted or unsubstituted aryl group. Among them, it is preferable that one of $Z^1$ and $Z^2$ is —$C(R^{126})$=, and the other is —N=. It is particularly preferable that $Z^2$ is —$C(R^{126})$ and $Z^1$ is —N=. $R^{126}$ preferably represents a substituted aryl group having 6 to 30 carbon atoms, or an unsubstituted alkyl group having 1 to 8 carbon atoms.

$R^{113}$ preferably represents a substituted or unsubstituted alkyl group, or a substituted or unsubstituted aryl group. Among them, a substituted or unsubstituted alkyl group having 1 to 30 carbon atoms, and a substituted or unsubstituted aryl group having 6 to 30 carbon atoms are more preferable. An unsubstituted alkyl group having 1 to 8 carbon atoms is particularly preferable.

$R^{114}$ is preferably a substituted or unsubstituted amino group, and more preferably an amino group substituted by an unsubstituted alkyl group having 1 to 30 carbon atoms, and an amino group substituted by a substituted or unsubstituted aryl group having 6 to 30 carbon atoms. An amino group substituted by an unsubstituted alkyl group having 1 to 8 carbon atoms is particularly preferable.

It is preferable that $R^{121}$ and $R^{122}$ each independently represent a substituted or unsubstituted alkyl group, or a substituted or unsubstituted aryl group. Among them, a substituted or unsubstituted alkyl group having 1 to 30 carbon atoms is more preferable and an unsubstituted alkyl group having 1 to 8 carbon atoms is particularly preferable. Further, it is preferable that $R^{121}$ and $R^{122}$ are the same.

It is preferable that $R^{123}$ and $R^{124}$ each independently represent a substituted or unsubstituted alkyl group, or a substituted or unsubstituted aryl group. Among them, a substituted or unsubstituted alkyl group having 1 to 30 carbon atoms, and an aryl group having 6 to 30 carbon atoms are more preferable. An unsubstituted alkyl group having 1 to 8 carbon atoms and a substituted aryl group having 6 to 30 carbon atoms are particularly preferable.

It is preferable that $R^{115}$ and $R^{116}$ each independently represent a substituted or unsubstituted alkyl group, a substituted or unsubstituted aryl group, a cyano group, or a substituted or unsubstituted alkoxycarbonyl group. Among them, $R^{115}$ is more preferably a cyano group, or a substituted or unsubstituted alkoxycarbonyl group having 1 to 30 carbon atoms, and a cyano group is particularly preferable.

$R^{116}$ is more preferably a substituted or unsubstituted alkoxycarbonyl group having 1 to 30 carbon atoms, and particularly preferably an unsubstituted alkyl group having 1 to 30 carbon atoms.

$Z^3$ and $Z^4$ each independently represent —$C(R^{127})$=, or —N=.

$R^{127}$ represents a substituted or unsubstituted alkyl group, or a substituted or unsubstituted aryl group.

Among them, it is preferable that one of $Z^3$ and $Z^4$ is —$C(R^{127})$= and the other is —N=. It is particularly preferable that $Z^3$ is —N= and $Z^4$ is —$C(R^{127})$=. $R^{127}$ is preferably a substituted aryl group having 6 to 30 carbon atoms, or an unsubstituted alkyl group having 1 to 8 carbon atoms.

In the aforementioned general formulae, m and n each independently represent 0 or 1. In case of general formula (II), it is preferable that m is 0 or 1 and n is 1, and it is more preferable that m is 1 and n is 0. In case of general formulae (I) and (III), it is preferable that m is 1 and n is 0 or 1, and it is more preferable that m and n are 1.

In the aforementioned general formulae (I), (II) and (III), M represents a hydrogen atom or a monovalent positive ion.

Suitable examples of the monovalent positive ion include alkaline metal ion (for example, sodium ion, potassium ion, lithium ion), alkaline earth metal ion (for example, one half of calcium ion, one half of magnesium ion), other metal ion (for example, one third of aluminum ion), transition metal ion (for example, one half of zinc ion), and organic positive ion (for example, tetraalkylammonium ion).

Among them, M is preferably sodium ion, potassium ion or hydrogen atom.

In the general formulae (I), (II) and (III) of the present invention, A and B are preferably different heterocyclic groups from the standpoint of black color tint. However, A and B are preferably the same from the standpoint of production costs. Further, it is preferable that at least one sulfonic acid group (or sulfonate) may exist in each molecule.

The compounds represented by the general formulae (I), (II) and (III) of the present invention are water soluble dyes, and each present a black color due to two broad absorption bands thereof existing in a visible region.

In the compounds (I) and (III) of the present invention, it is preferable that the peak of one of the aforementioned two absorption bands exists in the range of 430 to 480 nm and the peak of the other absorption band exists in the range of 570 to 630 nm, more preferably in the range of 570 to 600 nm. More preferably, the peak of the absorption band which is formed by the heterocyclic group represented by A and an azo group exists in the range of 570 to 630 nm and the peak of the absorption band which is formed by the heterocyclic group represented by B and an azo group exists in the range of 430 to 480 nm.

In the compound (II) of the present invention, it is preferable that the peak of one of the two absorption bands exists in the range of 430 to 480 nm and the peak of the other absorption band exists in the range of 550 to 630 nm. More preferably, the peak of one of the two absorption bands exists in the range of 430 to 460 nm and the peak of the other absorption band exists in the range from 570 to 600 nm. It is preferable that the peak of the absorption band which is formed by the heterocyclic group and an azo group represented by A exists in the range of 550 to 630 nm and the peak of the absorption band which is formed by the heterocyclic group represented by B and an azo group exists in the range of 430 to 480 nm.

[Compounds Represented by General Formulae (I), (II) and (III) Which are Coordinated by Metal Ion]

The compounds represented by the general formulae (I), (II) and (III) of the present invention each may be made into a compound obtained by being coordinated to metal ion according to the structure thereof, that is, a chelate dye. The thus formed compound is also preferable.

In the aforementioned chelate compounds, various known metal ions are used. Among them, copper ion, nickel ion, iron ion, cobalt ion, zinc ion, chrome ion and the like are suitably used.

However, the chrome ion has toxicity. Accordingly, the use of chrome ion is not preferable for such application as requires the state in which a human being directly contacts the chrome ion, for example, for a jet printing ink. On the other hand, chrome ion can be used in a state in which a human being does not directly contacts the chrome ion. A chrome chelate dye may improve light fastness. When a high fastness is required, chrome ion is preferably used.

Accordingly, copper chelate is more preferably used in the compounds of the present invention from the standpoint of satisfying the conditions of the dyes required for toxicity and fastness.

Next, a description will be given of examples in which the compounds represented by the general formulae (I), (II) and (III) of the present invention are coordinated to metal ion. However, the present invention is not limited to these examples.

(1) When the compound (I) of the present invention is used as the chelate dye, the compound represented by the following general formula IV-1, and the compound represented by the following general formula IV-2 are particularly preferably used.

General formula (IV-1)

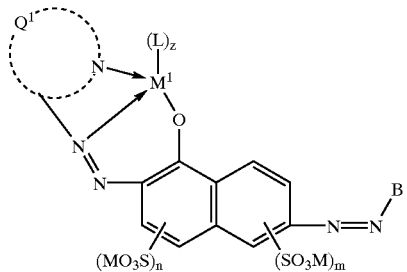

In the aforementioned general formula (IV-1), $M^1$ represents a metal ion. $Q^1$ is an atomic group of atoms which form a monovalent heterocyclic group bonded to an azo group by carbon atoms and is represented by A in the general formula (I). L represents a ligand coordinated at the metal ion, and z represents an integer of 0 or more, which is determined at a characteristic value by the metal ion. m and n each independently represent 0 or 1. M represents a hydrogen atom or a monovalent positive ion. B represents a monovalent heterocyclic group bonded to the azo group by a carbon atom.

The aforementioned $M^1$ is preferably a transition metal ion, and more preferably a copper ion.

General formula (IV-2)

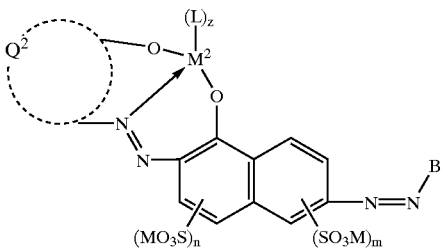

In the above general formula (IV-2), $M^2$ represents a metal ion. $Q^2$ is an atomic group of atoms which forms a heterocyclic group bonded to the azo group by a carbon atom, and is represented by A of the general formula (I). L represents a ligand coordinated at a metal ion. z represents an integer of 0 or more and is determined to become a characteristic value by the metal ion. m and n each independently represent 0 or 1. M represents a hydrogen atom or a monovalent positive ion. B represents a monovalent heterocyclic group bonded to the azo group by a carbon atom.

The aforementioned $M^2$ is preferably a transition metal ion, and more preferably a copper ion.

(2) Specific examples (V-1) and (V-2) of a preferred structure when the compound (II) of the present invention is used as the chelate dye will be hereinafter described.

General formula (V-1)

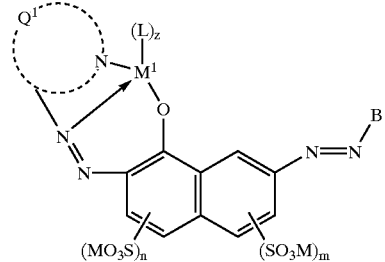

General formula (V-II)

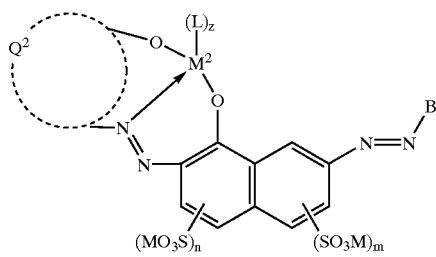

In the aforementioned examples (V-1) and (V-2) of the preferred structure, $M^1$ and $M^2$ represent a metal ion; $Q^1$ and $Q^2$ are each an atomic group of atoms which form a heterocyclic group represented by A in the general formula (II); L represents a ligand coordinated at a metal ion; and z represents an integer of 0 or more and is determined to become a characteristic value by the metal ion.

m and n each independently represent 0 or 1. M represents a hydrogen atom or a monovalent positive ion. B represents a monovalent heterocyclic group bonded to the azo group by a carbon atom.

(3) Specific examples VI-1 to VI-4 of a preferred structure when the compound (III) of the present invention is used as the chelate dye will be hereinafter described.

General formula (VI-1)

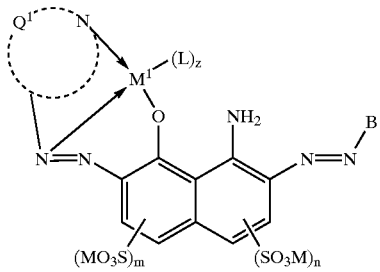

General formula (VI-2)

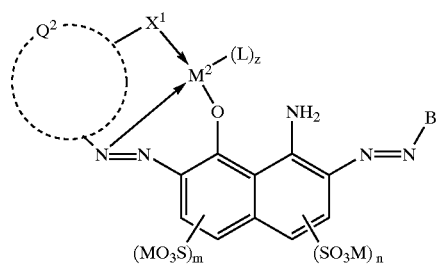

General formula (VI-3)

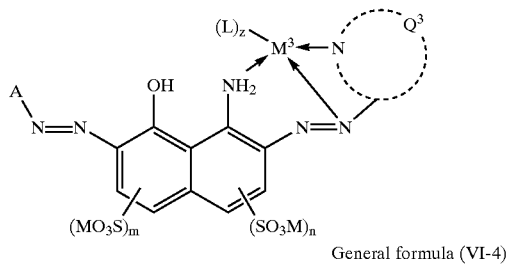

General formula (VI-4)

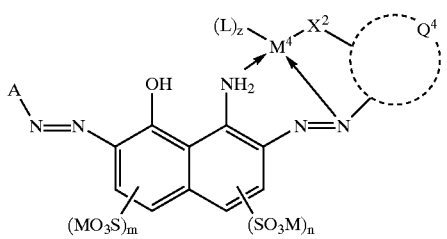

In the above examples (VI-1) to (VI-4) of the preferred structure, $M^1$ to $M^4$ represents a metal ion. $Q^1$ and $Q^2$ are each an atomic group of atoms which form a heterocyclic group represented by A in the general formula (III). $Q^3$ and $Q^4$ are each an atomic group of atoms which form a heterocyclic group and is represented by B in the general formula (III). $X^1$ and $X^2$ each represent an oxygen atom or —N(Ra)—, wherein Ra represents a hydrogen atom, an alkylsulfonyl group, or an arylsulfonyl group. L is a ligand coordinated at the metal ion, and z is an integer of 0 or more and is determined to become a characteristic value by the metal ion.

The meaning of Q represented by A or B include Q which is represented by A or B which become bivalent or more group from monovalent group by bonding to group(s) other than an azo group.

[Examples of Production Method of Compounds According to the Present Invention]

Next, a description will be given of examples of the compounds (I), (II) and (III) of the present invention and specific examples of the production method therefor. However, the present invention is not limited to these examples.

(1-a) Specific examples (exemplified compounds I-1 to I-28) of the compounds represented by the aforementioned general formulae (I), (IV-1) and (IV-2), and an example of synthesis method therefor will be described.

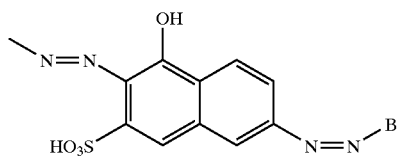

| Compound | A | B |
|---|---|---|
| I-1 | 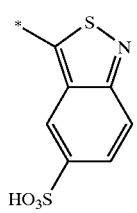 | 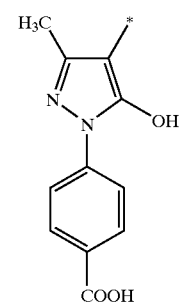 |
| I-2 | 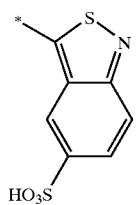 | 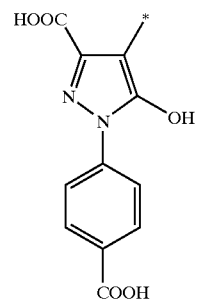 |

-continued
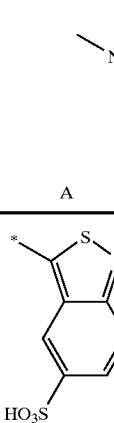
| Compound | A | B |
|---|---|---|
| I-3 | 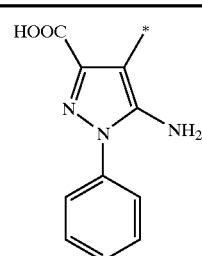 | 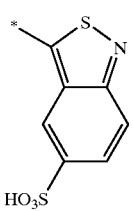 |
| I-4 | 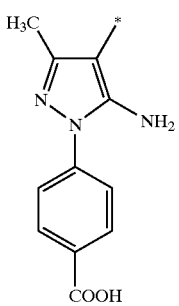 | 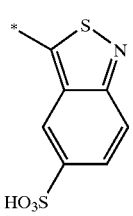 |
| I-5 | 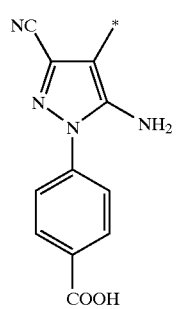 | 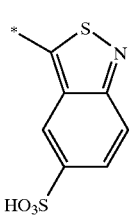 |
| I-6 | 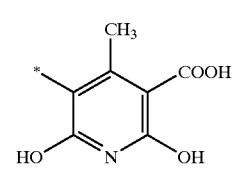 | 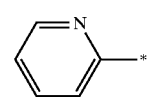 |
| I-7 | 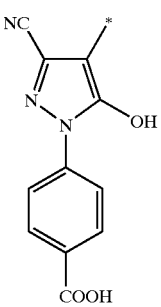 | |

-continued

| Compound | A | B |
|---|---|---|
| I-8 | 8-quinolinyl | 2,2-dimethyl-1,3-dioxane-4,6-dione-5-yl |
| I-9 | 5,6-dichlorobenzothiazol-2-yl | 2-methylpyrazolo[1,5-a]benzimidazol-3-yl |
| I-10 | 4-sulfo-1-naphthyl | 2-(3-carboxyphenyl)-5-methyl-pyrazolo[1,5-a][1,2,4]triazol-3-yl |
| I-11 | 3-methyl-4-carboxyisothiazol-5-yl | 3-tert-butyl-5-amino-1-(3-sulfopropyl)pyrazol-4-yl |
| I-12 | 4-cyano-5-methyl-3-carboxythiophen-2-yl | 3-cyano-4-methyl-2,6-bis(2-carboxyethylamino)pyridin-5-yl |

-continued
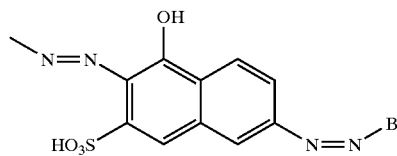
| Compound | A | B |
|---|---|---|
| I-13 | | |
| I-14 | | |
| I-15 | | |
| I-16 | | |
| I-17 | | |

-continued
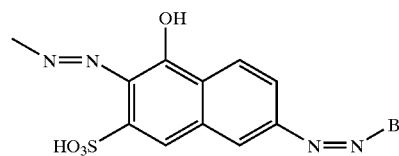
| Compound | A | B |
|---|---|---|
| I-18 | | |
| I-19 | | |
| I-20 | | |
| I-21 | | |
| I-22 | | |

-continued
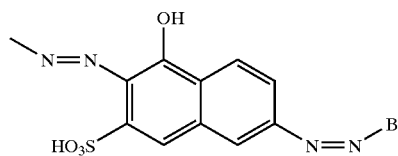
| Compound | A | B |
|---|---|---|
| I-23 | 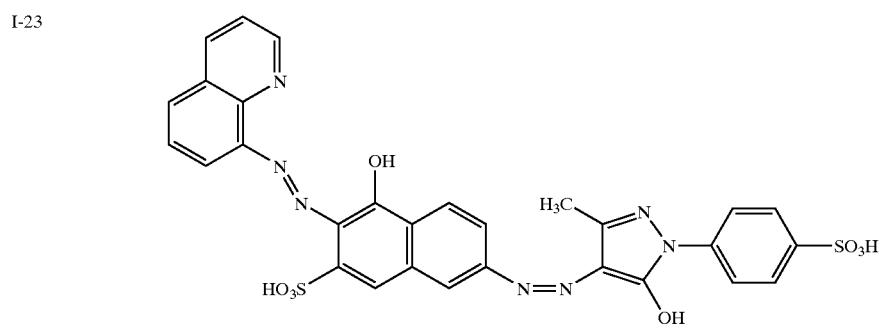 | |
| I-24 | 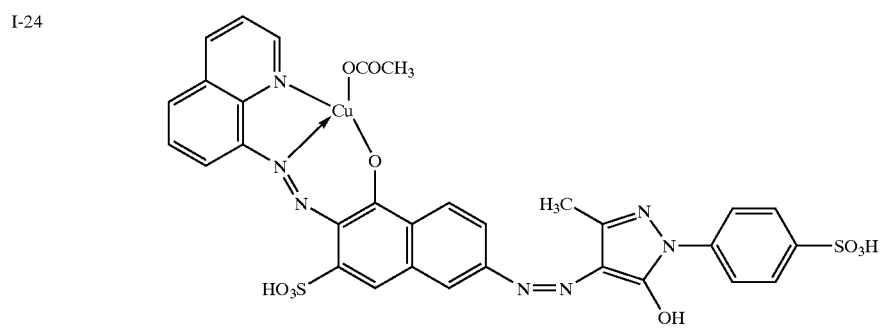 | |
| I-25 | 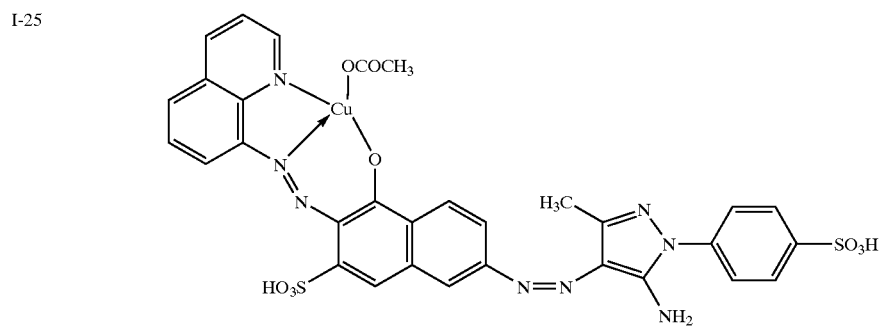 | |
| I-26 | 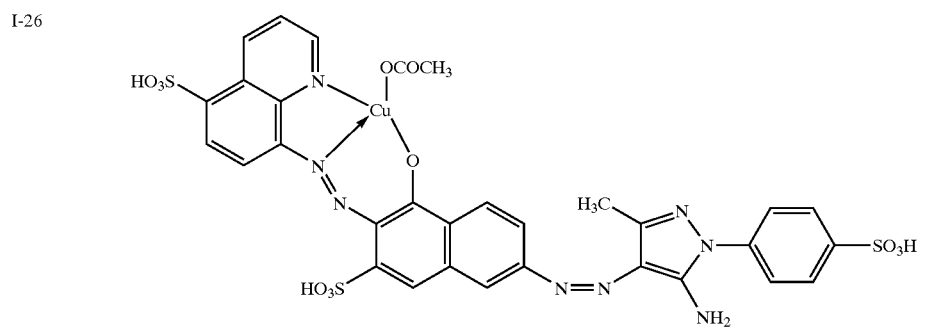 | |

| Compound | A | B |
|---|---|---|
| | (structure with OH, HO₃S, N=N to B) | |
| I-27 | (Cu complex structure with pyridine, OCOCH₃) | (pyrazole structure with H₃C, NH₂, SO₃H) |
| I-28 | (Cu complex structure with pyridine, OCOCH₃) | (pyrazole structure with H₃C, OH, SO₃H) |

(1-b) Synthesis Method of the Compound Represented by General Formula (I)

The synthesis method of the compound represented by the general formula (I) of the present invention will be described hereinafter. The compound (I) of the present invention can be synthesized by a method shown by the following route A or B.

[General synthesis method of compound (I) of the present invention route A]

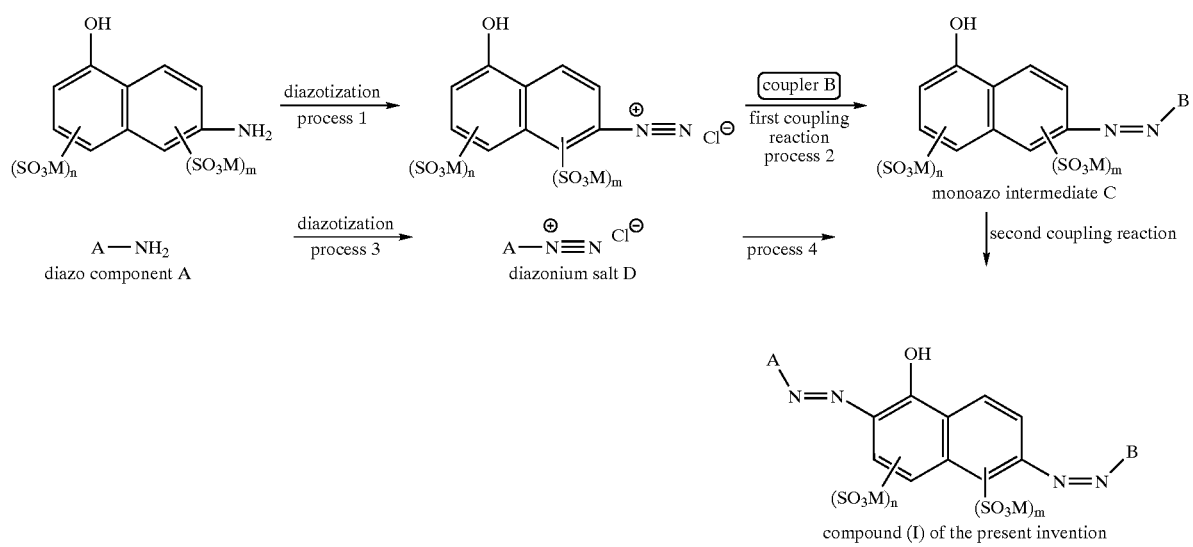

compound (I) of the present invention

[General synthesis method of compound (I) of the present invention route B]

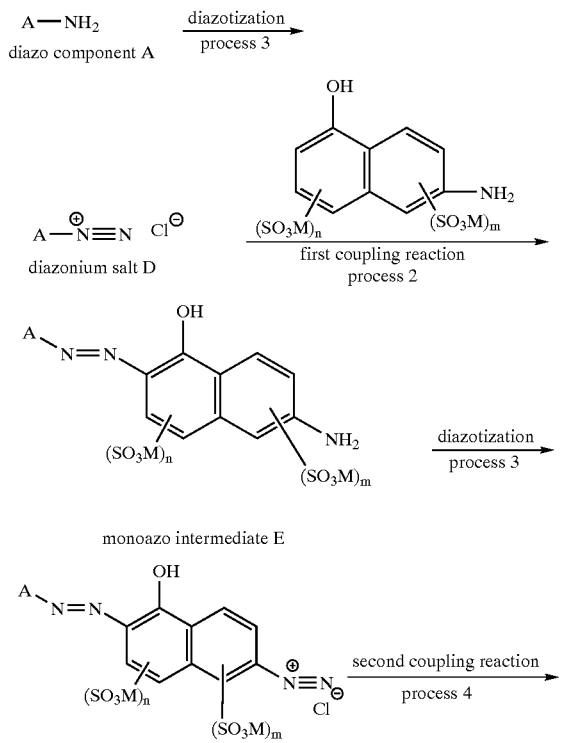

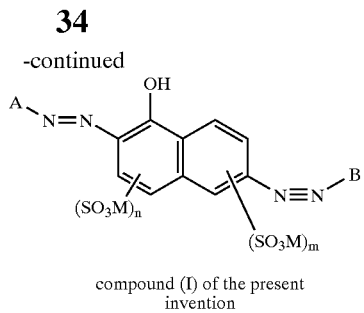

compound (I) of the present invention

In the above route A, a diazonium salt of a β-naphtylamine derivative is synthesized and a coupler corresponding to the coupler component B is reacted to synthesize a monoazo intermediate C (containing the coupler component B). Thereafter, a diazonium salt corresponding to the diazo component A is reacted.

In the above route B, a diazonium salt corresponding to the diazo component A is reacted on on a β-naphtylamine derivative to synthesize a monoazo intermediate E (containing a diazo component A). The monoazo intermediate is diazotized and reacted on a coupler which gives the coupler component B, thereby synthesizing the compound of the present invention.

(2-a) Specific examples (exemplified compounds II-1 to II-32) of the compound represented by the general formula (II) and of the compounds represented by the general formulae (V-1) and (V-2) of the present invention will be described below. The present invention is not limited to these examples.

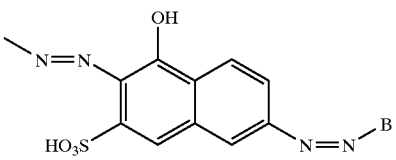

| Compound | A | B |
|---|---|---|
| II-1 | ![structure] | ![structure] |
| II-2 | ![structure] | ![structure] |

-continued
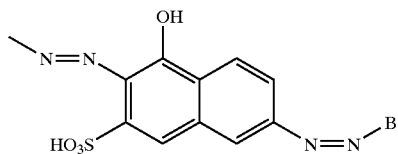
| Compound | A | B |
|---|---|---|
| II-3 | | |
| II-4 | | |
| II-5 | | |
| II-6 | | |
| II-7 | | |

-continued

| Compound | A | B |
|---|---|---|
| II-8 | 8-quinolinyl | 2-methyl-pyrazolo-benzimidazole |
| II-9 | 5,6-dichloro-benzothiazol-2-yl | 3-cyano-5-hydroxy-1-(4-carboxyphenyl)pyrazol-4-yl |
| II-10 | 4-sulfo-naphthalen-1-yl | 6-(3-carboxyphenyl)-2-methyl-pyrazolo-triazol-7-yl |
| II-11 | 3-methyl-4-carboxy-isothiazol-5-yl | 1,2-diphenyl-3,5-dioxo-pyrazolidin-4-yl |
| II-12 | 4-cyano-3-carboxy-5-methyl-thiophen-2-yl | 3-tert-butyl-5-amino-1-(3-sulfopropyl)pyrazol-4-yl |

-continued
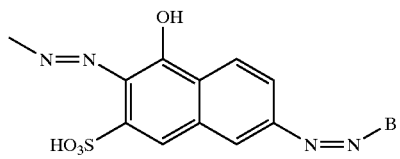
| Compound | A | B |
|---|---|---|
| II-13 | | |
| II-14 | | |
| II-15 | | |
| II-16 | | |
| II-17 | | |

-continued
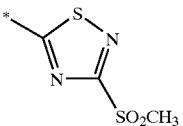
| Compound | A | B |
|---|---|---|
| II-18 | 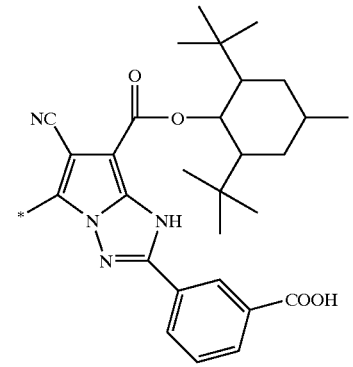 | 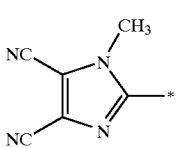 |
| II-19 | 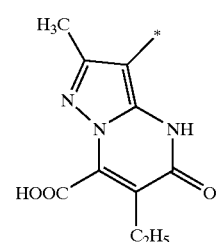 | 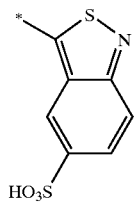 |
| II-20 | 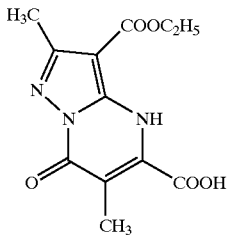 | 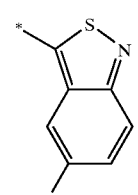 |
| II-21 | 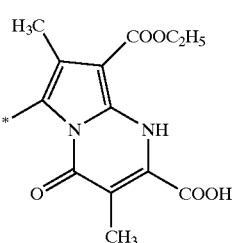 | 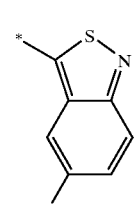 |
| II-22 | 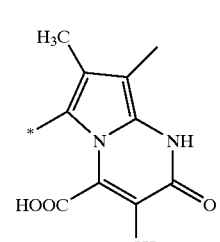 | |

-continued
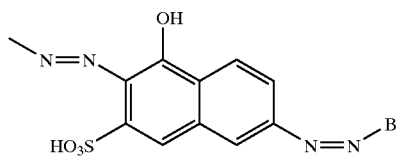
| Compound | A | B |
|---|---|---|
| II-23 | | |
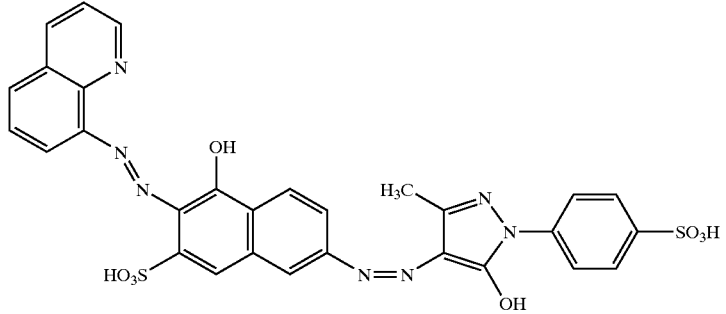
II-24
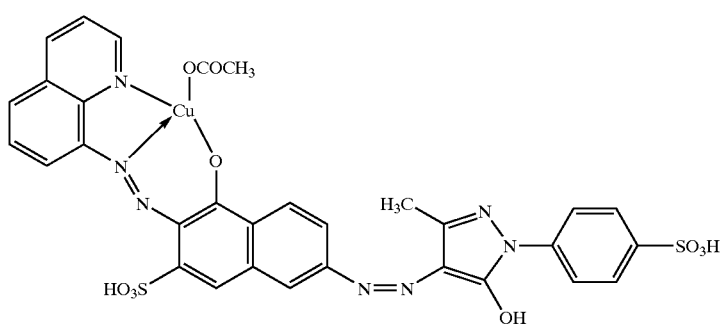
II-25
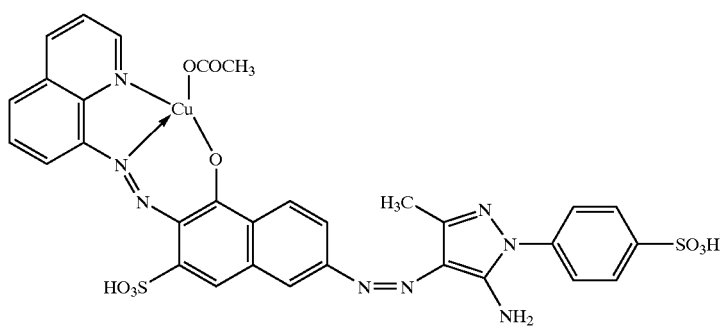
II-26
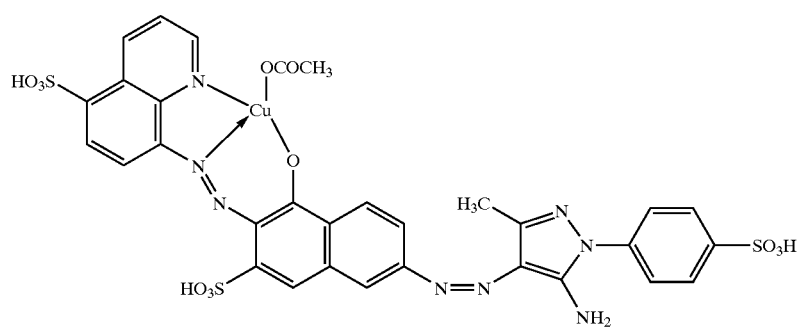

-continued
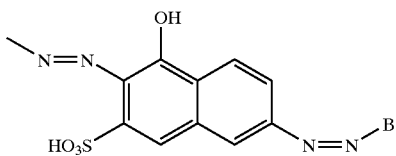
| Compound | A | B |
|---|---|---|
| II-27 | | |
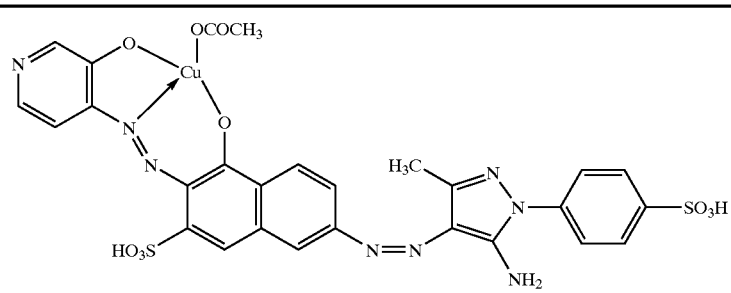
II-28
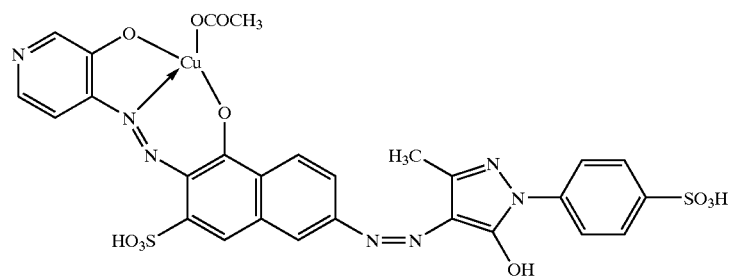
II-29
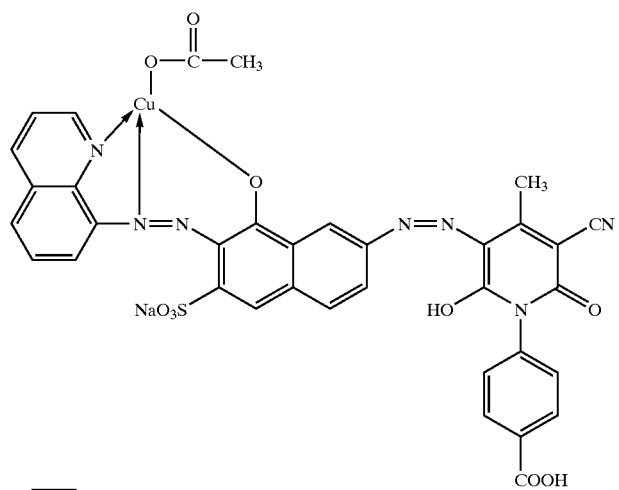
II-30
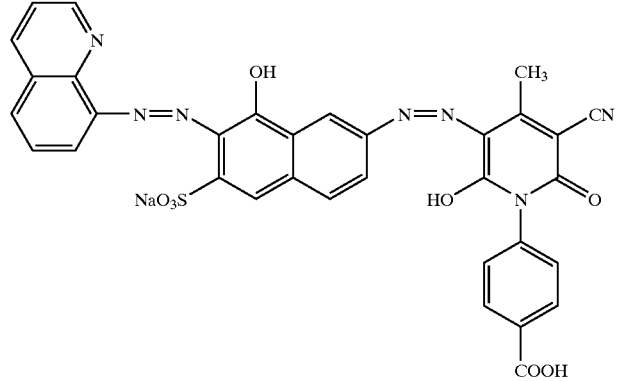

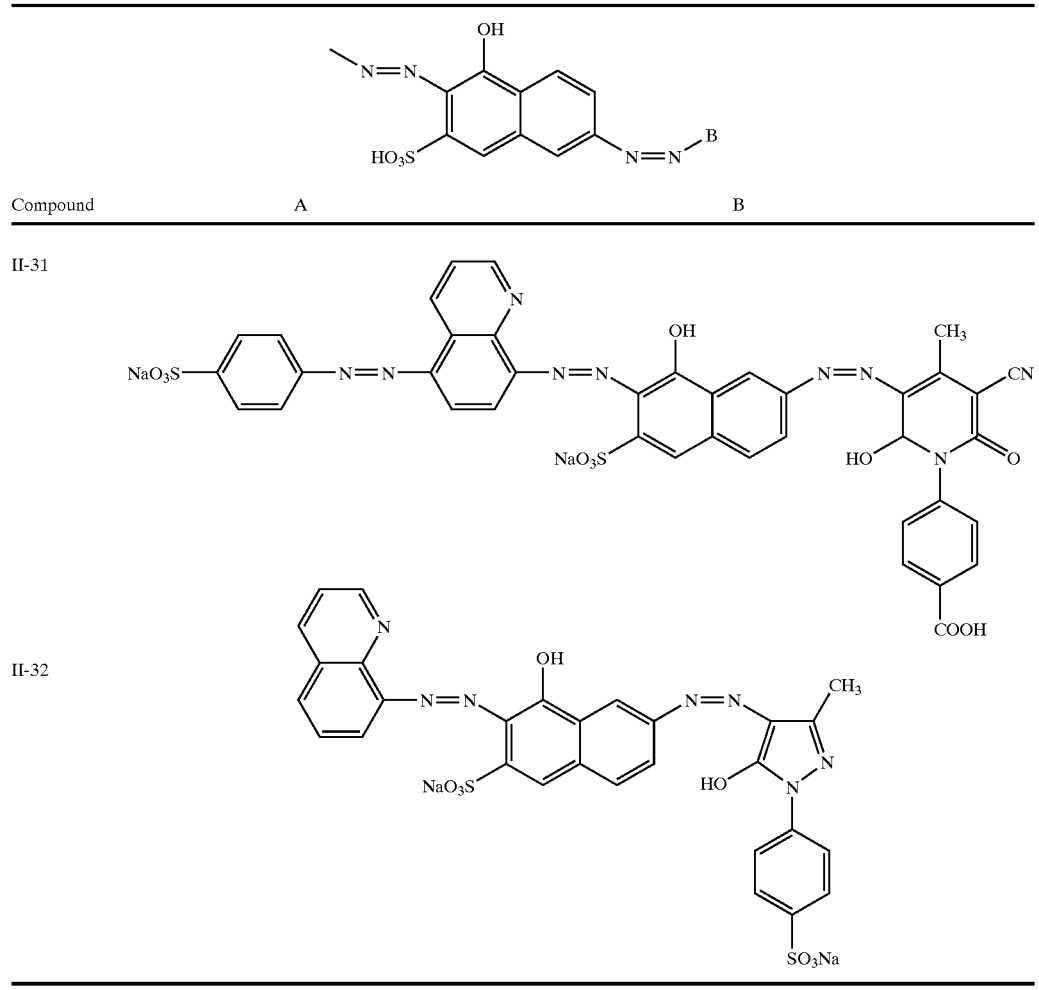
(2-b) Examples of the synthesis method of the compound represented by the general formula (II) will be described below.
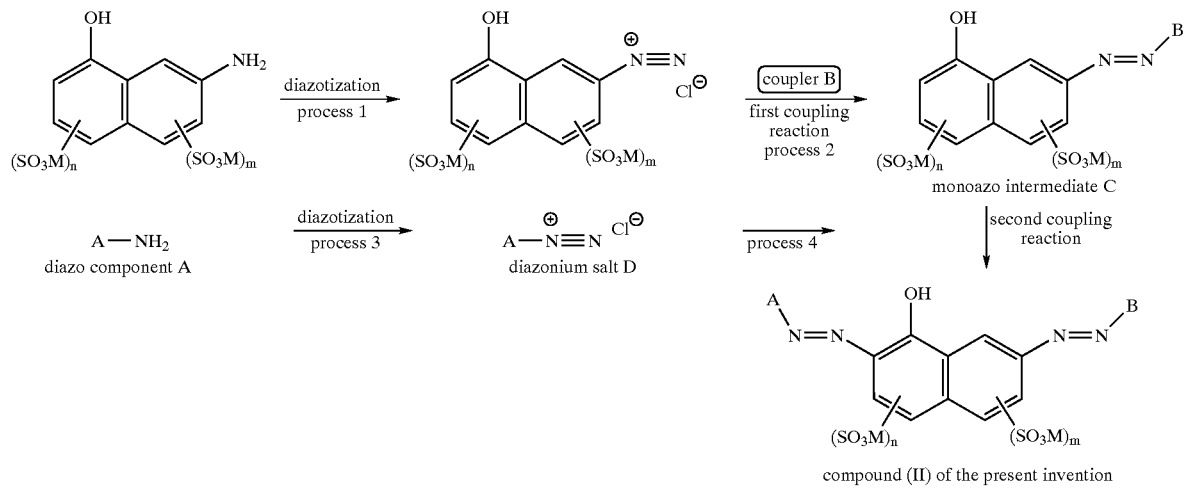

[General synthesis method of compound (II) of the present invention route B]

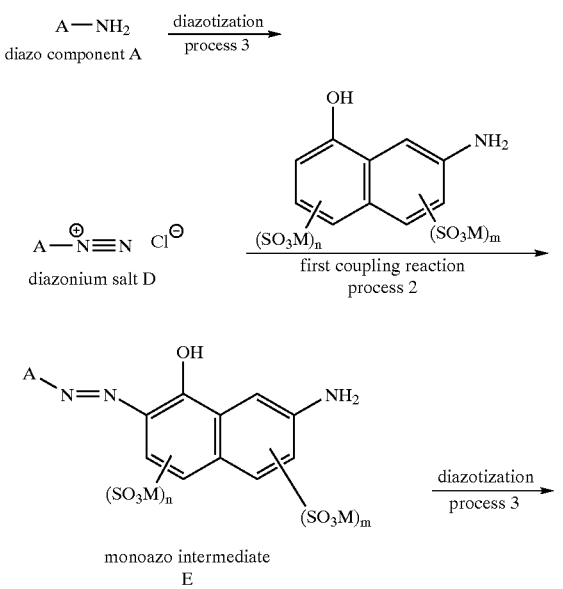

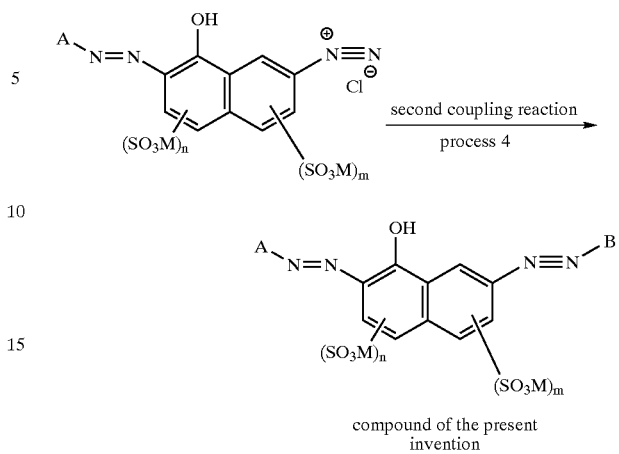

(3-a) Specific examples (exemplified compounds III-1 to III-30) of the compounds represented by the general formula (III) and general formulas (VI-1) to (VI-4) will be described below.

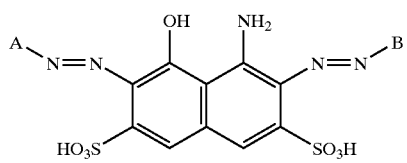

| Compound | A | B |
|---|---|---|
| III-1 | 2-pyridyl | 3-(benzo[c]isothiazolyl)-6-sulfo |
| III-2 | 8-quinolyl | 3-(benzo[c]isothiazolyl)-6-sulfo |
| III-3 | 5-methyl-2-thienyl | 2-(ethylthio)-1,3,4-thiadiazol-5-yl |

-continued
| | | |
|---|---|---|
| III-4 | 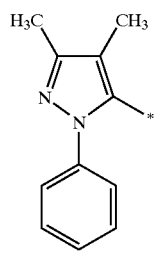 | 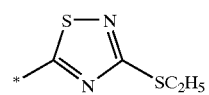 |
| III-5 | 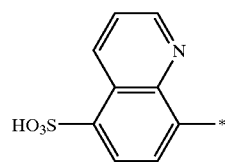 | 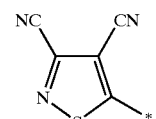 |
| III-6 | 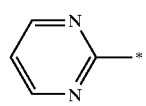 | 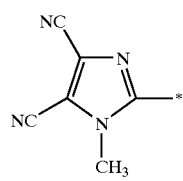 |
| III-7 | 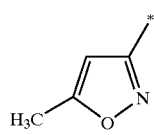 | 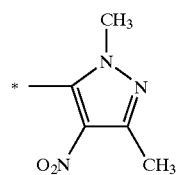 |
| III-8 | 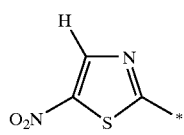 | 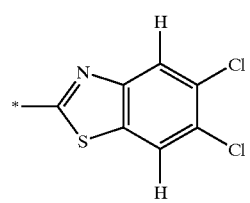 |
| III-9 | 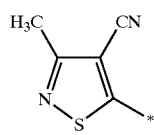 | 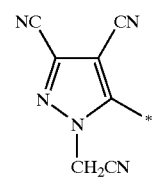 |
| III-10 | 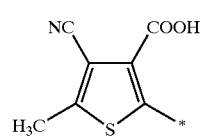 | 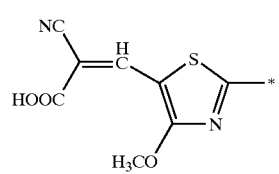 |

-continued
| | | |
|---|---|---|
| III-11 | 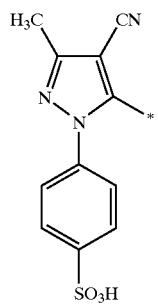 | 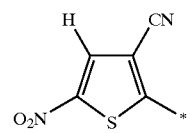 |
| III-12 | 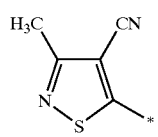 | 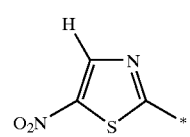 |
| III-13 | 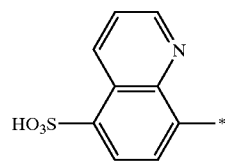 | 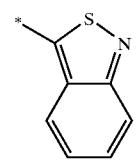 |
| III-14 | 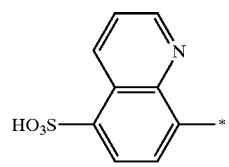 | 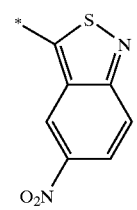 |
| III-15 | 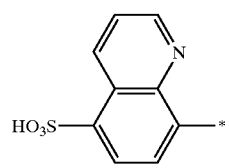 | 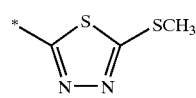 |
| III-16 | 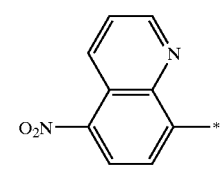 | 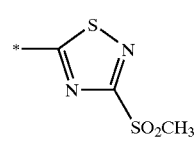 |
| III-17 | 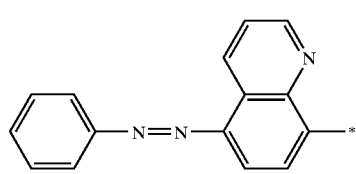 | 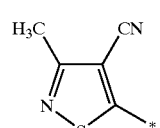 |

-continued
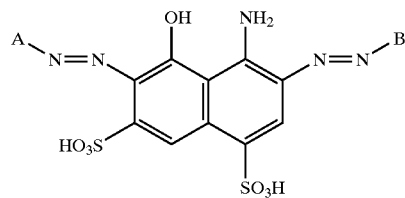
| Compound | A | B |
|---|---|---|
| III-18 | 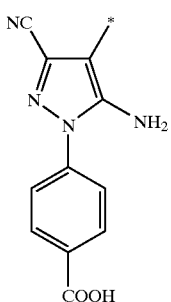 | 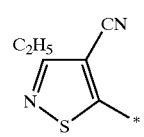 |
| III-19 | 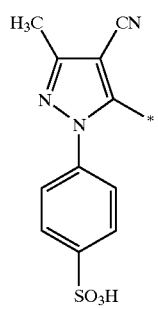 | 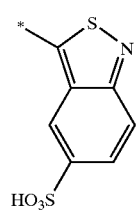 |
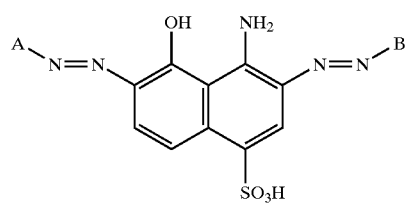
| Compound | A | B |
|---|---|---|
| III-20 | 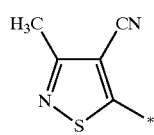 | 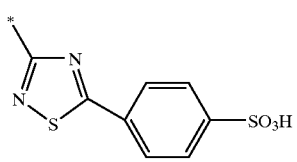 |
| III-21 | 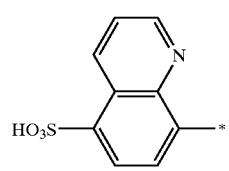 | 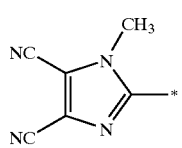 |

-continued
III-22
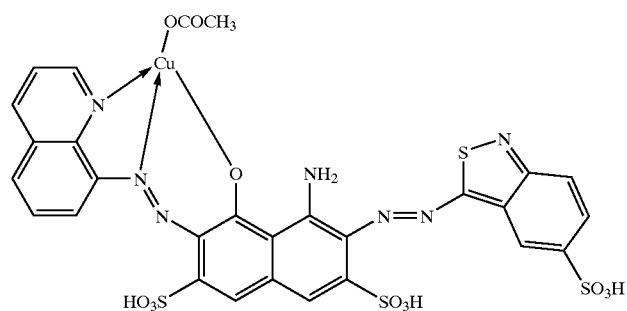
III-23
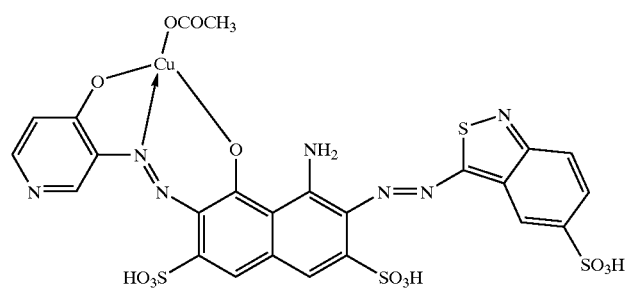
III-24
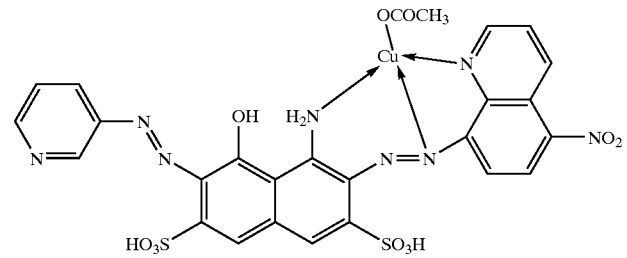
III-25
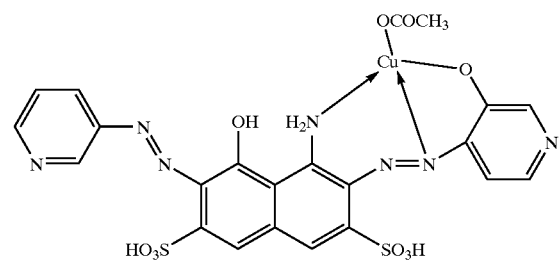
III-26
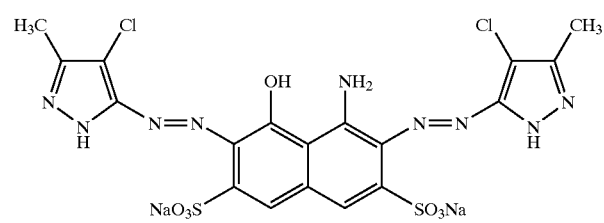

-continued
III-27
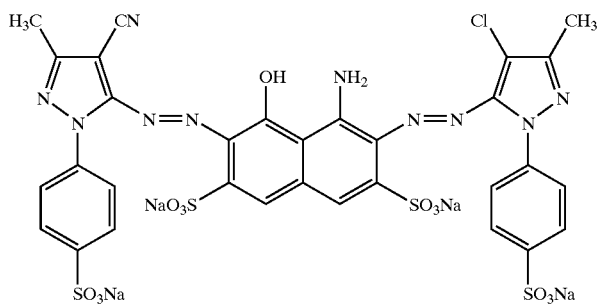
III-28
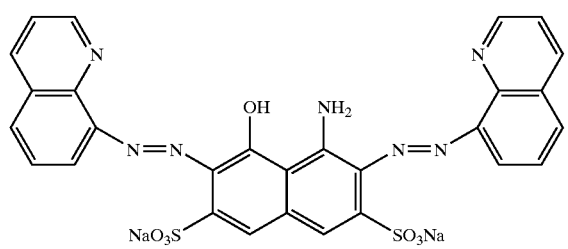
III-29
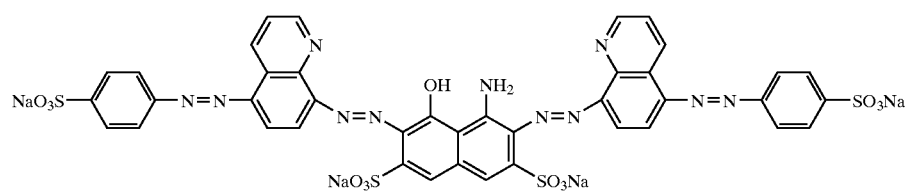
III-30
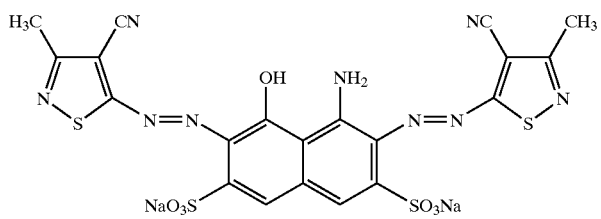
(3-b) Synthesis Method of Compound Represented by General Formula (III)
A synthesis method of the compound represented by the general formula (III) of the present invention will be described hereinafter. This compound of the present invention can be synthesized by the following synthesis method (1) or (2).
Synthesis method (1)
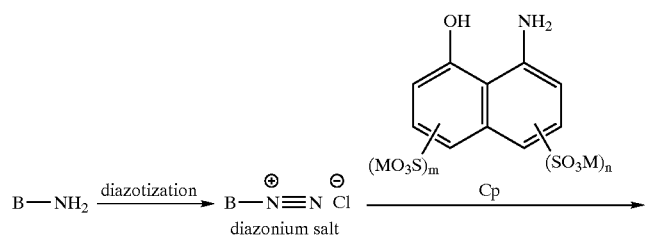

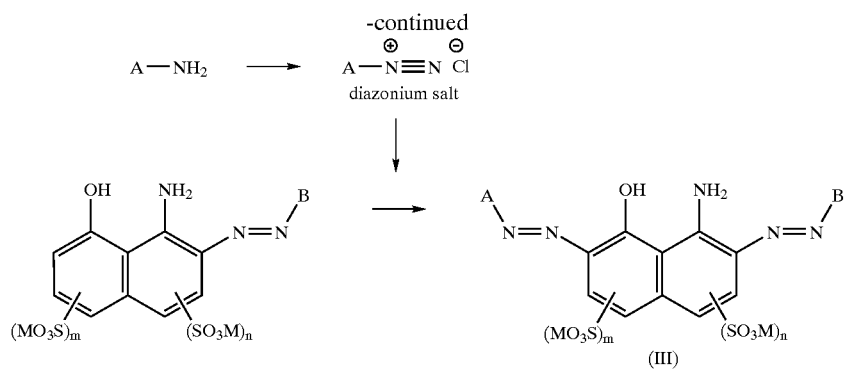

Synthesis method (2)

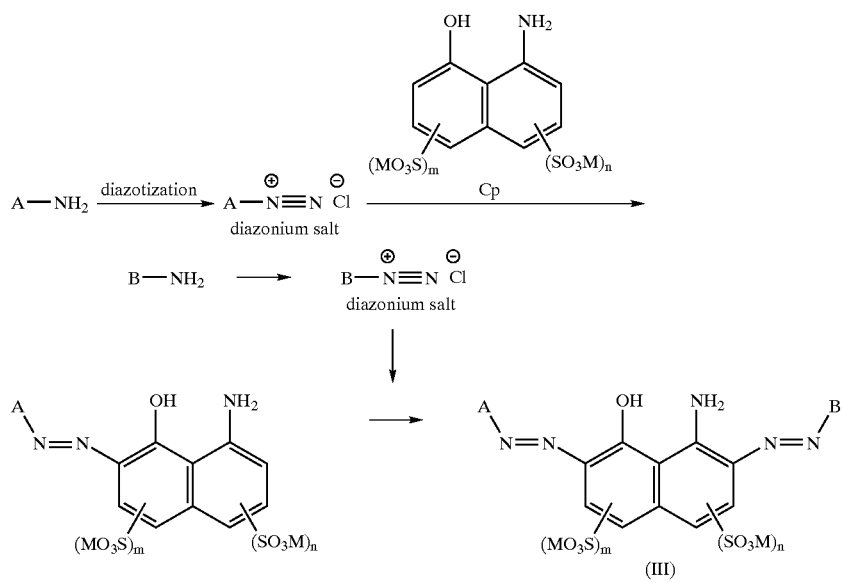

In the aforementioned synthesis methods (1) and (2), the compound represented by the general formula (III) is synthesized in such a manner that the diazo components (diazonium salt) which give A and B are sequentially reacted on a naphthol-based coupler represented by Cp.

The order of an azo coupling reaction for A and B may not be limited. It is preferable that an azo group at a portion B is first introduced, and thereafter an azo group at a portion A is introduced. That is, the synthesis method (1) is more preferable.

More specifically, an aminoheterocyclic compound corresponding to the portion B is diazotized to prepare a diazo liquid, and the liquid is reacted on the coupler (Cp) to obtain z reaction product. In this case, the reaction liquid is preferably acid. Subsequently, an aminoheterocyclic compound corresponding to the portion A is diazotized and an azo coupling reaction on the reaction product is carried out. In this case, the reaction liquid is preferably alkaline.

The azo coupling reaction mentioned herein is described in "Chemistry of Synthetic Dye" (by Kenzo Konishi and Nobuhiko Kuroki, published by Maki Shoten, 1963, published at Tokyo).

[Dye, Color Composition and Jet Printing Ink]

Next, a description will be given of a dye, a colored composition containing dyes of the present invention, and jet printing ink.

The compounds represented by the general formulae (I) to (VI-4) of the present invention are direct dyes according to their physical properties, and therefore, allow dyeing of a material composed of cellulose. Further, these compounds also allow dyeing of other materials having a carbon-amide bond, and can be widely used for the purpose of dyeing leather, cloth and paper.

The dye of the present invention are typically used for a color composition, an ink and a jet printing ink, with the dyes being dissolved in a liquid medium.

The dye of the present invention contains at least one of the compounds represented by the general formulae (I) to (VI-4).

The color composition containing the dyes of the present invention is prepared by dissolving the compounds represented by the general formulae (I) to (VI-4) in water or in water containing other water soluble substances.

In preparation of the above color composition, the other water soluble substance is contained in the range in which the effects of the compounds of the present invention are not impaired. Examples of the other water soluble substance include an organic solvent (soluble in water), additives, germicide and antimold agent.

Suitable examples of the above organic solvent include alcohols, ethers, carboxamides, ureas, ester, sulfones, sulfonamides, esters and nitrils. Among them, for example, methanol, ethanol, propanol, ethyleneglycol, monomethyl-ether thereof, and 1,2-propyleneglycol are preferable. Further, organic solvents disclosed in Japanese Patent Application Laid-Open (JP-A) No. 11-349835 are also preferably used.

These organic solvents may be used singly or may be used in a combination of two or more.

Examples of the above additives include viscosity controlling agent, surface tension controlling agent, pH controlling agent, anti-foaming agent, drying inhibitor, permeation accelerator, UV absorber, and anti-oxidizing agent. It is preferable that the viscosity and surface tension of the color composition of the present invention are each controlled in the optimum range by adjusting the ion concentration by means of the viscosity controlling agent or surface tension controlling agent.

Further, as the other substance soluble in water, the aforementioned germicide and antimold agent can be used.

As the aforementioned surface tension controlling agent, nonionic, cationic, or anionic sarfactant, or the like is appropriately used.

Examples of the pH controlling agent include alkali metal hydrides such as lithium hydroxide and potassium hydroxide, carbonates such as sodium carbonate and sodium hydrogencarbonate, inorganic bases such as potassium acetate, sodium silicate and disodium phosphate, organic bases such as N-methyldiethanolamine and triethanolamine, and the like.

The pH of the color composition is preferably 6 to 10, and more preferably 7 to 10 from the standpoint of improving storage stability.

The surface tension of the color composition is preferably 25 to 70 mN/m, and more preferably 25 to 60 mN/m.

Further, the viscosity of the color composition is preferably 30 mPa·s or less, and more preferably 20 mPa·s or less.

As the aforementioned anti-foaming agent, a chelating agent represented by fluorine-based or silicone-based compound, or EDTA can also be used if necessary.

The aforementioned drying inhibitor is suitably used for the purpose of preventing clogging caused by drying of ink in an ink injection opening of a nozzle used in an ink-jet recording system when the color composition of the present invention is contained and used in a jet printing ink.

A preferred example of the drying inhibitor is a water-soluble organic solvent whose vapor pressure is lower than that of water. Specific examples of the drying inhibitor include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerine and trimethylolpropane, lower alkyl ethers of polyhydric alcohol such as ethylene glycol monomethyl (or monoethyl) ether, diethylene glycol monomethyl (or monoethyl) ether, and triethylene glycol monoethyl (or butyl) ether, heterocyclic rings such as 2-pyrolidone, N-methyl-2-pyrolidone, 1,3-dimethyl-2-imidazolidinone and N-ethylmorpholine, sulfur-contained compounds such as sulfolane, dimethylsulfoxide, and 3-sulfolene, polyfunctional compounds such as diacetone alcohol and diethanolamine, and a urea derivative. Among them, polyhydric alcohols such as glycerine and diethylene glycol are more preferable.

These materials may be used singly or may be used in a combination of two or more. The drying inhibitor is preferably contained in the aforementioned color composition in the range of 10 to 50 mass %.

The aforementioned permeation accelerator is suitably used for the purpose of improving permeation of the color composition into paper.

Examples of the permeation accelerator include alcohols such as ethanol, isopropanol, butanol, di(tri)ethylene glycol monobutyl ether and 1,2-hexanediol, sodium lauryl sulfate, sodium oleate, and nonionic sarfactant.

The permeation accelerator is contained in the range in which printing stain, print through and the like are not caused. The permeation accelerator contained in the color composition in an amount of 5 to 30 mass % ordinarily exhibits sufficient effects.

The aforementioned UV absorber is used for the purpose of improving image storability. For example, a benzotriazole-based compound described in JP-A Nos. 58-185677, 61-190537, 2-782, 5-197075 and 9-34057, a benzophenone-based compound described in JP-A Nos. 46-2784 and 5-194483 and in U.S. Pat. No. 3,214,463, a cinnamic acid-based compound described in Japanese Patent Application Publication (JP-B) Nos. 48-30492 and 56-21141, and in JP-A No. 10-88106, a triazine-based compound described in JP-A Nos. 4-298503, 8-53427, 8-239368 and 10-182621, and in Japanese Patetn Publication No. 8-501291, a compound which absorbs ultraviolet rays and emits fluorescence, represented by compounds described in Research Disclosure No. 24239, or a stilbene-based or benzoxazol-based compound, that is, fluorescent whitening agent, and the like are used.

The aforementioned anti-oxidizing agent is used for the purpose of improving image storability. For example, various organic and metallic complex-based anti-fading agent can be used.

Examples of the organic anti-fading agent include hydroquinones, alkoxyphenols, dialkoxyphenols, phenols, anilines, amines, indanes, chromans, alkoxyanilines, and heterocyclic rings.

Examples of the metallic complex-based anti-fading agent include a nickel complex, a zinc complex and the like. Specifically, compounds described in Research Disclosure No. 17643 (VII-I to VII-J), Research Disclosure No. 15162, Research Disclosure No. 18716 (in the left column of page 650), Research Disclosure No. 307105 (on page 872), Research Disclosure No. 36544 (on page 527) and Research Disclosure No. 15162, and compounds included in the general formulae and examples of representative compounds described in JP-A No. 62-215272 (on pages 127 to 137) can be used.

Examples of the aforementioned antimold agent include sodium dehydroacetate, sodium benzoate, sodium pyridinethion-1-oxide, p-hydroxybenzoic acid ethyl ester, 1,2-benzisothiazoline-3-on and salts thereof. These materials are preferably used in the color composition in an amount of 0.02 to 1.00 mass %.

In the color composition which include the dye of the present invention, other dyes having various color hues may be mixed to allow fine control of black color tint. In this case, besides the compounds of the present invention, dyes of yellow, magenta, cyan and the like can be used.

In the ink composition which include the dye of the present invention, the compounds represented by the aforementioned general formulae (I) to (IV-4) are each preferably contained in the range of 0.5 to 20 mass %, more preferably in the range of 1 to 15 mass %, and further preferably in the range of 3 to 10 mass %, based on the total mass of ink.

The dye of the present invention can be used in various industrial fields, and is favorably used for ink such as autograph aqueous ink, aqueous printing ink, information recording ink and the like. It is particularly preferable that the dye is used for jet printing ink containing the dyes. Accordingly, the ink and the jet printing ink of the present invention is characterized by containing the dye of the present invention, and is favorably used in an ink-jet recording method of the present invention, which will be described below.

[Ink-Jet Recording Method]

Next, the ink-jet recording method of the present invention will be described.

The ink-jet recording method of the present invention provides recording using a jet printing ink which contains the aforementioned color composition.

In the ink-jet recording method of the present invention, recording is carried out on an image receiving material by using the jet printing ink which contains the aforementioned color composition. In this case, an ink nozzle used therein and the like are not particularly limited, and can be selected appropriately according to purposes.

The aforementioned image receiving material is not particularly limited. Examples thereof include known recording materials, such as plain paper, resin-coated paper, paper used for ink-jet printing, film, electrophotographic shared paper, cloth, glass, metal, ceramics and the like.

Among the aforementioned recording materials, paper used for ink-jet printing is preferable. For example, materials disclosed in JP-A Nos. 8-169172, 8-27693, 2-276670, 7-276789, 9-323475, 62-238783, 10-153989, 10-217473, 10-235995, 10-337947, 10-217597 and 10-337947 are more preferable.

Further, in the ink-jet recording method of the present invention, recording paper and recording film, which will be described below, are particularly preferable among the aforementioned image receiving materials.

The recording paper and recording film are each comprised of a support and an image receiving layer in a layered form, and also comprised of a back coating layer and the like in a layered form, if necessary.

The image receiving layer and other various layers each may be comprised of one layer, or two or more layers.

The aforementioned support may be composed of chemical pulp such as LBKP or NBKP, mechanical pulp such as GP, PGW, RMP, TMP, CTMP, CMP or CGP, or used paper pulp such as DIP, and may also include conventionally known pigment, binder, sizing agent, fixing agent, cationic agent, paper strength reinforcing agent and the like added and mixed together, if necessary, and further may be produced by various devices such as a Fourdrinier paper machine and a cylinder paper machine. Additionally, synthetic paper, plastic film sheet and the like may also be used.

The thickness of the support is approximately 10 to 250 $\mu$m and the weighing capacity thereof is preferably 10 to 250 g/m$^2$.

The aforementioned support may include the image receiving layer and also include the back coating layer. Further, after size press coating, or after formation of an anchor coating layer, with starch, polyvinyl alcohol or the like, the image receiving layer and back coating layer may also be provided on the support.

Further, the support may be subjected to flattening by a calender device such as machine calender, TG calender or soft calender.

Among the aforementioned support materials, a sheet of paper having surfaces laminated with a film of polyolefin (for example, polyethylene, polystyrene, polyethylene terephthalate, polybutene and copolymers thereof), and a plastic film are preferably used.

Preferably, a white pigment (for example, titanium oxide, zinc oxide or the like) or a coloring dye (for example, cobalt blue, ultramarine, neodymium oxide or the like) is added into the polyolefin.

The aforementioned image receiving layer contains a pigment, an aqueous binder, a mordant, waterproof agent, a light-resistance improver, sarfactant and other additives.

The aforementioned pigment is preferably a white pigment. Suitable examples of the white pigment include inorganic white pigments such as calcium carbonate, kaolin, talc, clay, diatomaceous earth, synthetic amorphous silica, aluminium silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-based pigment, acrylic pigment, urea resin and melamine resin.

Among these white pigments, a porous inorganic pigment is preferable, and synthetic amorphous silica having a large pore area is more preferable.

As the synthetic amorphous silica, either silicic anhydride obtained by a dry process and silicic hydrate obtained by a wet process can be used. The use of silicic hydrate is particularly preferable.

Examples of the aqueous binder include water soluble high polymers such as polyvinyl alcohol, silanol-denatured polyvinyl alcohol, starch, cationic starch, casein, gelatin, carboxymethylcellulose, hydroxyethylcellulose, polyvinylpyrrolidone, polyalkylene oxide and polyalkylene oxide derivative, and water-dispersion high polymers such as styrenebutadiene latex and acrylic emulsion.

These aqueous binders may be used singly or may be used in a combination of two or more. Among these materials, polyvinyl alcohol and silanol-denatured polyvinyl alcohol are preferable in the viewpoint of adhesion with respect to the aforementioned pigment and peeling resistance of the image receiving layer.

It is preferable that the aforementioned mordant is immobilized. Accordingly, a polymer mordant is preferably used.

The polymer mordant is described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134 and 1-161236, U.S. Pat. Nos. 2,484,430, 2,548,564, 3,148,061, 3,309,690, 4,115,124, 4,124,386, 4,193,800, 4,273,853, 4,282,305 and 4,450,224. Polymer mordants described in JP-A No. 1-161236 (on pages 212 to 215) are particularly preferable. When the polymer mordants described therein are used, an image of excellent image quality is obtained and light resistance of the image is improved.

The aforementioned waterproof agent is effective for the purpose of water resistance of an image. A cationic resin is favorably used.

Examples of the cationic resin include polyamidepolyamine epichlorohydrin, polyethyleneimine, polyaminesulfone, dimethyldiallylammonium chloride polymer, cationic polyacrylamide and colloidal silica. Among them, polyamidepolyamine epichlorohydrin is particularly preferable.

The amount of the cationic resin contained is preferably in the range of 1 to 15 mass % based on the total solid content of the image receiving material, more preferably in the range of 3 to 10 mass %, and further preferably in the range of 4 to 8 mass %.

Examples of the aforementioned light-resistance improver include zinc sulfide, zinc oxide, hindered amine-based anti-oxidizing agent, benzophenone-based or benzotriazole-based UV absorber and the like. Among them, zinc sulfide is particularly preferable.

The aforementioned sarfactant serves as a coating aid, a releasing aid, a slipping aid, or an antistatic agent. Examples of the sarfactant are described in JP-A Nos. 62-173463 and 62-183457.

Organic fluorine compounds may be used in place of the sarfactant. The organic fluorrine compounds are preferably hydrophobic. Examples of the organic fluorine compounds include a fluorine-based sarfactants, oily fluorine-based compounds (for example, fluorine oil) and solid fluorine compound resin (for example, tetrafluoroethylene resin).

The organic fluorine compounds are described in Japanese Patent Application Publication (JP-B) No. 57-9053 (column 8 to 17), and JP-A Nos. 61-20994 and 62-135826.

The aforementioned other additives include pigment dispersing agent, viscosity improver, anti-foaming agent, dyes, fluorescent whitening agent, antiseptic agent, pH controlling agent, matting agent, hardening agent and the like.

The aforementioned back coating layer contains a white pigment, aqueous binder and other components.

Examples of the white pigment include inorganic white pigments such as light calcium carbonate, heavy calcium carbonate, kaolin, talc, calcium sulfide, barium sulfide, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate and magnesium hydroxide, organic pigments such as styrene-based plastic pigment, acrylic plastic pigment, polyethylene, micro capsule, urea resin and melamine resin.

Examples of the aforementioned aqueous binder include water soluble high polymers such as styrene/maleate copolymer, styrene/acrylate copolymer, polyvinyl alcohol, silanol-denatured polyvinyl alcohol, starch, cationic starch, casein, gelatin, carboxymethylcellulose, hydroxyethylcellulose and polyvinylpyrrolidone, and water dispersion high polymers such as styrenebutadiene latex and acrylic emulsion.

As the aforementioned other components, anti-foaming agent, foam inhibitor, dyes, fluorescent whitening agent, antiseptic agent, waterproof agent and the like are used.

The component layers (containing the back coating layer) in the aforementioned recording paper and recording film may include a polymer latex added thereto.

The polymer latex is used for the purpose of improving characteristics of the layers, for example, giving dimensional stability and inhibiting curling, adhesion and cracking of the layers.

The polymer latex is described in JP-A Nos. 62-245258, 62-1316648 and 62-110066.

When a polymer latex having a low glass transition temperature (not higher than 40° C.) is added to the layer containing the mordant, cracking and curling of the layer can be prevented. Further, when a polymer latex having a high glass transition temperature is added to the back coating layer, curling of the layer can be prevented.

The ink-jet recording method of the present invention is not particularly limited. Any publicly known methods, for example, a charge controlling system in which ink is discharged by utilizing electrostatic attracting force, a drop-on-demand system utilizing vibrational pressure of a piezo-electric element (pressure pulse system), an acoustic ink jet system in which an electric signal is changed to an acoustic beam and applied to ink, and the ink is discharged by utilizing radiation pressure, a thermal ink jet (bubble jet) system in which ink is heated to form bubbles and thus generated pressure is utilized, and the like can be used.

There are some types of the ink-jet recording method. For example, in one type, many small drops of thin ink (referred to as "photo-ink") are jetted out. In another type, a plurality of inks having substantially the same hue but different concentrations are employed so as to improve image quality. Further, colorless and transparent ink can be used for the ink-jet recording.

EXAMPLES

The present invention will be described hereinafter with reference to the following examples, but is not limited to these examples.

Example 1
[Synthesis of Compound I-23]

First, the compound I-23 (dye I-23) as an exemplified compound was synthesized through the following processes. Each of the processes will be described below.

Synthesis of compound I-23:

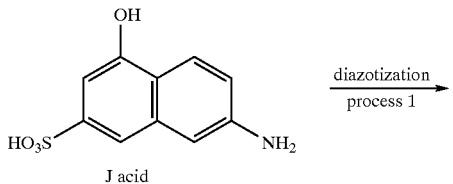

J acid diazotization
process 1

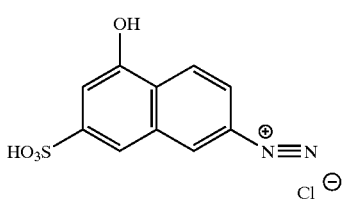

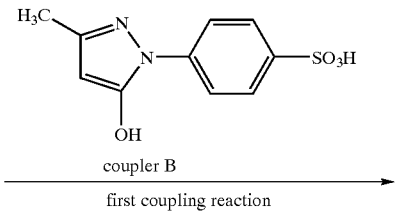

coupler B first coupling reaction
process 2

-continued

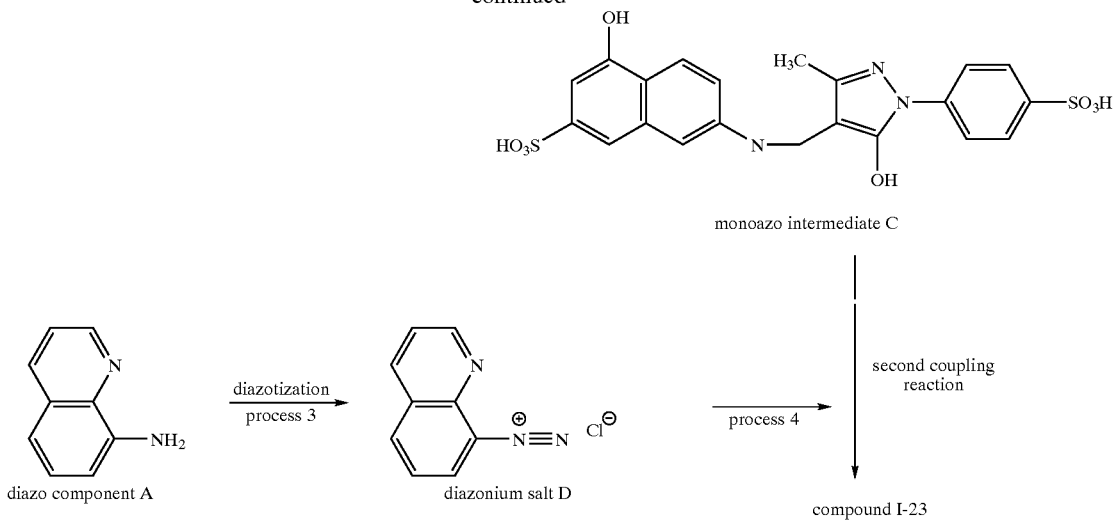

monoazo intermediate C

↓ second coupling reaction / process 4 compound I-23

Process 1:
  4.0 g (17 mmol) of J acid was dissolved in 50 ml of water, and 0.68 g (17 mmol) of sodium hydroxide and 1.38 g (21 mmol) of sodium nitrite were added thereto. The obtained liquid was dripped into a mixed solution in which 6.97 ml (84 mmol) of concentrated hydrochloric acid and 50 ml of water are being stirred at 5° C. The resultant liquid was stirred for four hours and a diazo liquid of J acid was prepared.
Process 2:
  The coupler B was dissolved in a mixed liquid which contains 50 ml of water and 50 ml of methanol. Subsequently, 11.5 g (170 mmol) of potassium acetate was added thereto, and stirred at 5° C. Dripped in the mixture being stirred was the diazo liquid of J acid prepared by the process 1. After stirring for 30 minutes, separated crystals were filtered and dried to obtain 5.9 g (yield: 77%) of monoazo intermediate C.
Process 3:
  0.1 g (0.66 mmol) of diazo component A was dissolved in 50 ml of water and stirred. Dripped into the liquid being stirred, was a solution containing 0.055 g (0.79 mmol) of sodium nitrite dissolved in 10 ml of water. After stirring for 30 minutes, a diazo liquid containing diazonium salt D was prepared.
Process 4:
  0.3 g (0.59 mmol) of monoazo intermediate C and 0.32 g (5.62 mmol) of potassium hydroxide were dissolved in 50 ml of water and stirred at 5° C. Dripped in the resultant liquid being stirred, was the diazo liquid prepared by the process 3. After stirring for two hours, the obtained mixture was made to stand for 12 hours at room temperatures. Thereafter, acetone was added to the obtained reaction liquid to precipitate and filter a solid. The obtained solid was subjected to refining using a Sephadex column to obtain 0.22 g (yield: 56%) of compound I-23.
  The mass spectrum and NMR spectrum were measuref for the obtained compound I-23 and structural identification was carried out.
  Further, in the obtained compound I-23, PKa (25° C.) in a solution in which the ratio of tetrahydrofuran to water is 60:40 was measured. The first dissociation was obtained such that PKa=9.6.
  The measurement results of absorption spectrum of a solution (dimethylformamide: water=1:1; volume ratio) containing the compound I-23 are shown in FIG. 1.

Example 2
Synthesis of Compound I-24:
  A copper chelation of the compound I-23 was carried out by using copper acetate ($Cu(OCOCH_3)_2$) to synthesize the compound I-24.

Example 3
[Synthesis of Compound II-23]
  First, the compound II-23 as an exemplified compound is synthesized through the following processes. Each of the processes will be described below.

Synthesis of compound II-23:

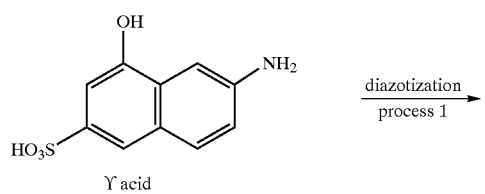

Y acid diazotization process 1 →

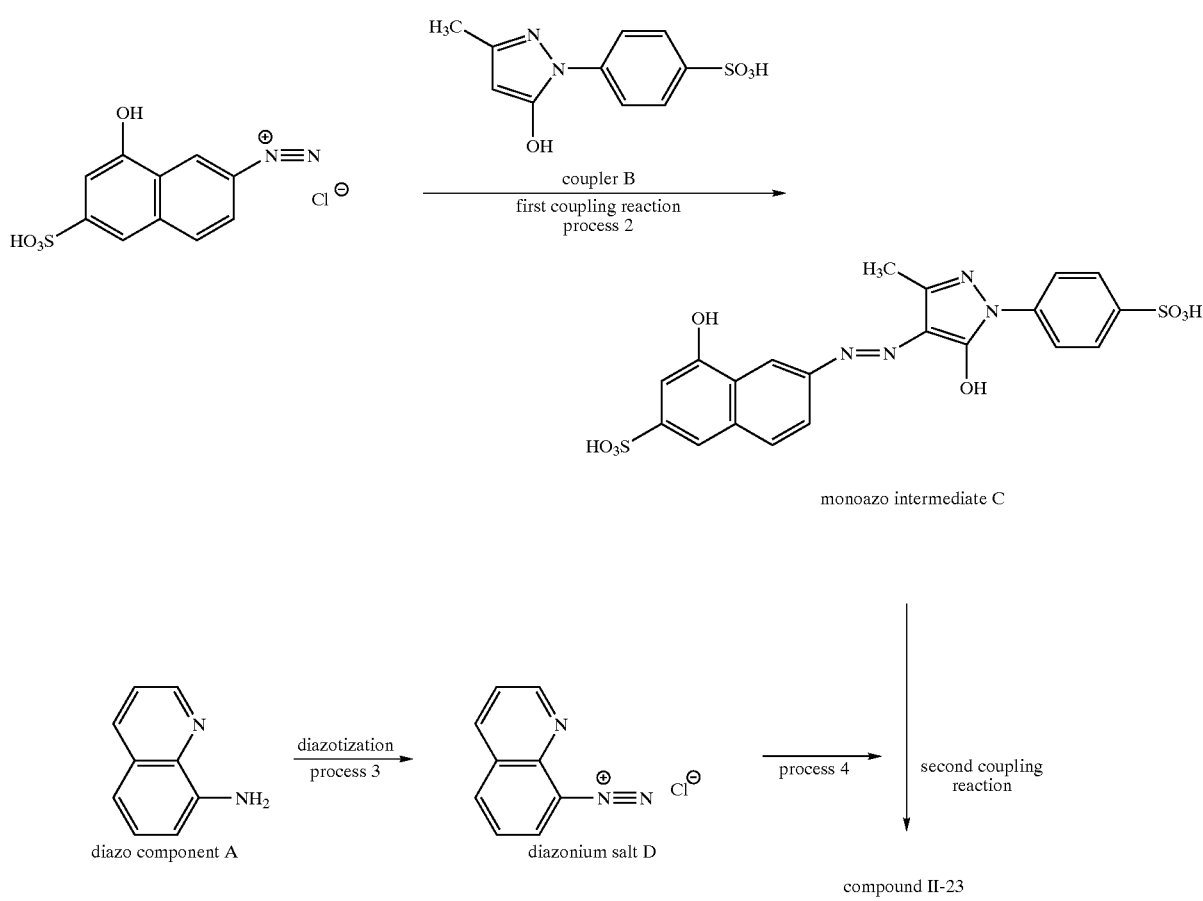

monoazo intermediate C compound II-23

Process 1:

4.0 g (17 mmol) of γ acid was dissolved in 50 ml of water, and 1.38 g (21 mmol) of sodium hydroxide and sodium nitrite were added thereto. The obtained liquid was dripped into a mixture in which 6.97 ml (84 mmol) of concentrated hydrochloric acid and 50 ml of water were being stirred at 5° C. After stirring for four hours, a diazo liquid of γ acid was prepared.

Process 2:

The coupler B was dissolved in a mixed solution containing 50 ml of water and 50 ml of methanol. Subsequently, 11.5 g (170 mmol) of potassium acetate was added thereto and stirred at 5° C. Dripped into the resultant liquid being stirred, was the diazo liquid of r acid prepared by the process 1. After stirring for 30 minutes, separated crystals were filtered and dried to obtain 5.9 g (yield: 70%) of a monoazo intermediate C.

Process 3:

0.1 g (0.66 mmol) of diazo component A was dissolved in 50 ml of water and stirred. Dripped into the obtained liquid being stirred, was a solution which contains 0.055 g (0.79 mmol) of sodium nitrite dissolved in 10 ml of water. After stirring for 30 minutes, a diazo liquid containing diazonium salt D was prepared.

Process 4:

0.3 g (0.59 mmol) of monoazo intermediate C and 0.32 g (5.62 mmol) of potassium hydroxide were dissolved in 50 ml of water and stirred at 5° C. Dripped into the mixed liquid being stirred, was the diazo liquid prepared by the process 3. After stirring for two hours, the mixture was made to stand for 12 hours at room temperatures. Thereafter, acetone was added to the resultant reaction liquid to separate out and filter a solid. The obtained solid was subjected to refining using a Sephadex column to obtain the compound II-23.

The mass spectrum was measured for the obtained compound II-23 and structural identification was carried out. The parent peak (M-1) was 658 (negative).

In the obtained compound II-23, PKa (acid dissociation index) in the solution containing tetrahydrofuran and water in the ratio of 60:40 (volume ratio) at 25° C. was measured. The first dissociation was 7.9 and the second dissociation was 12.6.

Example 4

[Synthesis of Compound II-24]

A copper chelation of the compound II-23(dye I-23) was carried out by using copper acetate ($Cu(OCOCH_3)_2$), and the compound II-24 was synthesized.

Figure 2:
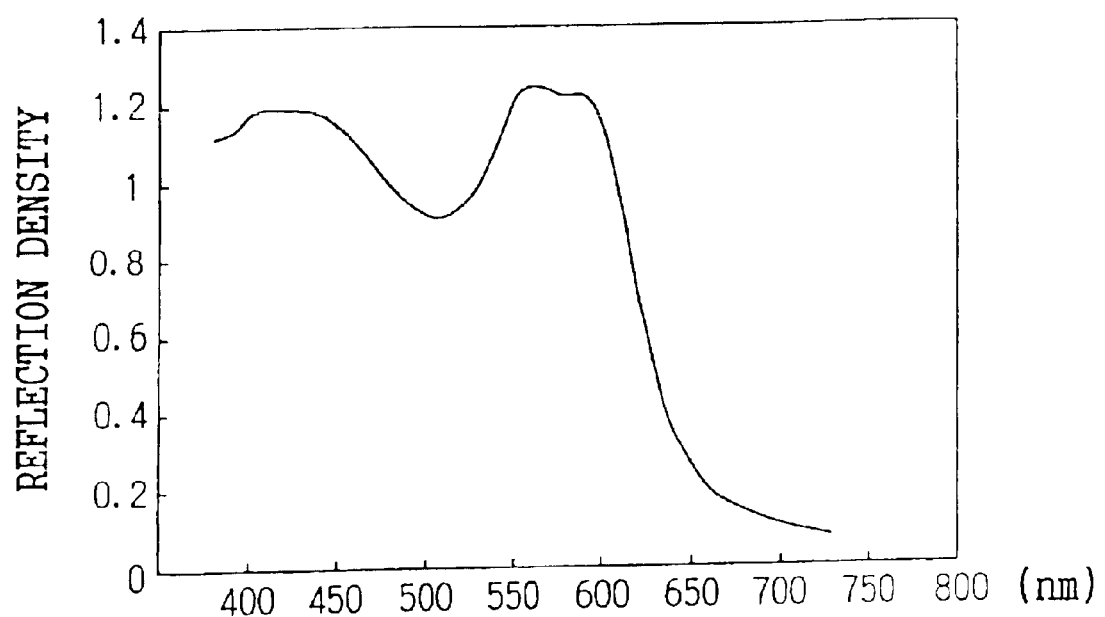
FIG. 2 is a figure showing a measurement result of reflection spectrum of a recorded image by a jet printing ink containing a compound II-24 of the present invention.

The measurement results of reflection spectrum of a recorded image formed by using a jet printing ink which contains the compound II-24 (dye II-24) are shown in FIG. 2.

Example 5

[Synthesis of Compound II-30]

The compound II-30 was synthesized through processes of the following synthesis example. Each of the processes will be described below.

[Synthesis of compound II-30]

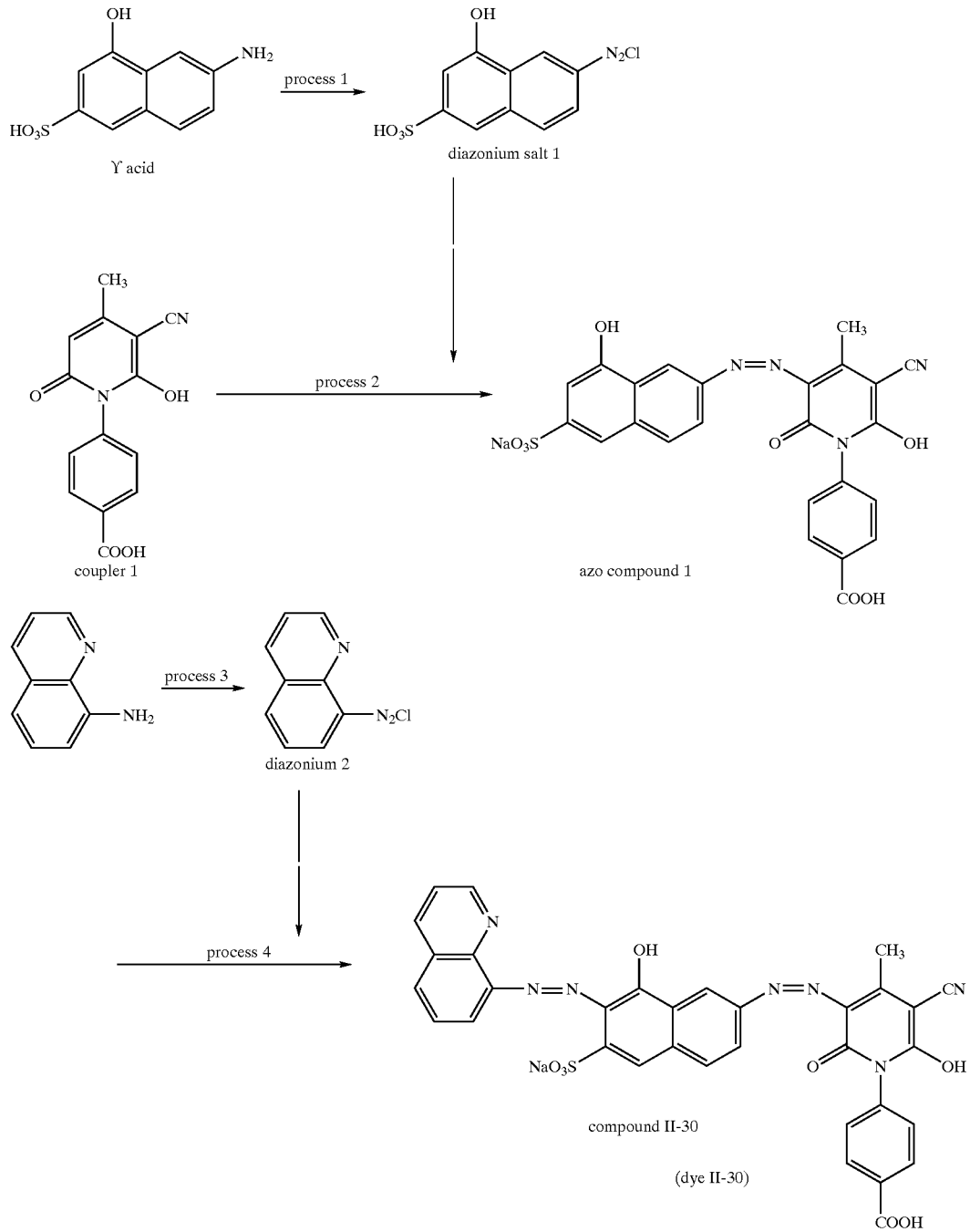

Process 1 (Synthesis of Diazonium Salt 1):

7.98 g (33.3 mmol) of γ acid, 67 ml of water, 1.47 g (36.8 mmol) of sodium hydroxide, and 2.42 g (36.8 mmol) of sodium nitrite were stirred for 20 minutes at room temperatures and dissolved. Dripped into a mixture containing 14.2 ml (16.5 mmol) of concentrated hydrochloric acid and 20 ml of water being stirred while being cooled, was the above solution in 15 minutes. In this case, the temperature of the reaction liquid was 2 to 4° C. After stirring for four hours, 0.2 g (2.06 mmol) of sulfamine acid was added thereto and stirred for 30 minutes at 5° C., to prepare diazonium salt of r acid (diazonium salt 1).

Process 2 (Synthesis of Diazo Compound I):

8.5 g (31.3 mmol) of coupler 1, 24.5 g (250 mmol) of sodium acetate, and 150 g of water were stirred while being cooled, and the diazo liquid containing the above diazonium salt 1 was all dripped into the mixture being stirred, over 15 minutes. The obtained mixture was made to react for one hour at a reaction temperature of 5° C., and further react for one hour at a reaction temperature of 10° C. After made to stand overnight, crystals were separated out. 700 ml of acetonitrile and 40 ml of methanol were added to the reaction liquid and stirred and filter the crystals. The obtained crystals were dried to obtain 10.67 g of azo compound 1 (yield: 63.0%).

Process 3 (Synthesis of Diazonium Salt 2):

0.72 g (5.0 mmol) of 8-aminoquinoline and 20 ml of water were stirred while being cooled, and 2.2 ml (25 mmol) of concentrated hydrochloric acid was added thereto. Dripped into the mixed liquid was a solution containing 0.38 g (5.5 mmol) of sodium nitrite and 3.8 ml of water over five minutes. After the obtained product was made to react for two hours while being cooled, 0.049 g (5.0 mmol) of sulfamine acid was added thereto and further made to react for 30 minutes to prepare diazonium salt 2.

Process 4 (Synthesis of Dyes):

3.0 g (5.5 mmol) of diazo compound 1, 210 ml of water, 70 ml of dimethylacetoamide and 4.6 g (56 mmol) of sodium acetate were stirred while being cooled, and the diazonium salt 2 was dripped in this mixture being stirred, over 15 minutes. The obtained product was made to react for two hours and stand overnight at room temperatures, and crystals were separated out. 1000 ml of acetonitrile was added to the reaction liquid and stirred, and the crystals were filtered. The crude product was refined by using a Sephadex column to obtain 1.94 g of dye II-30(yield: 52%).

Figure 3:
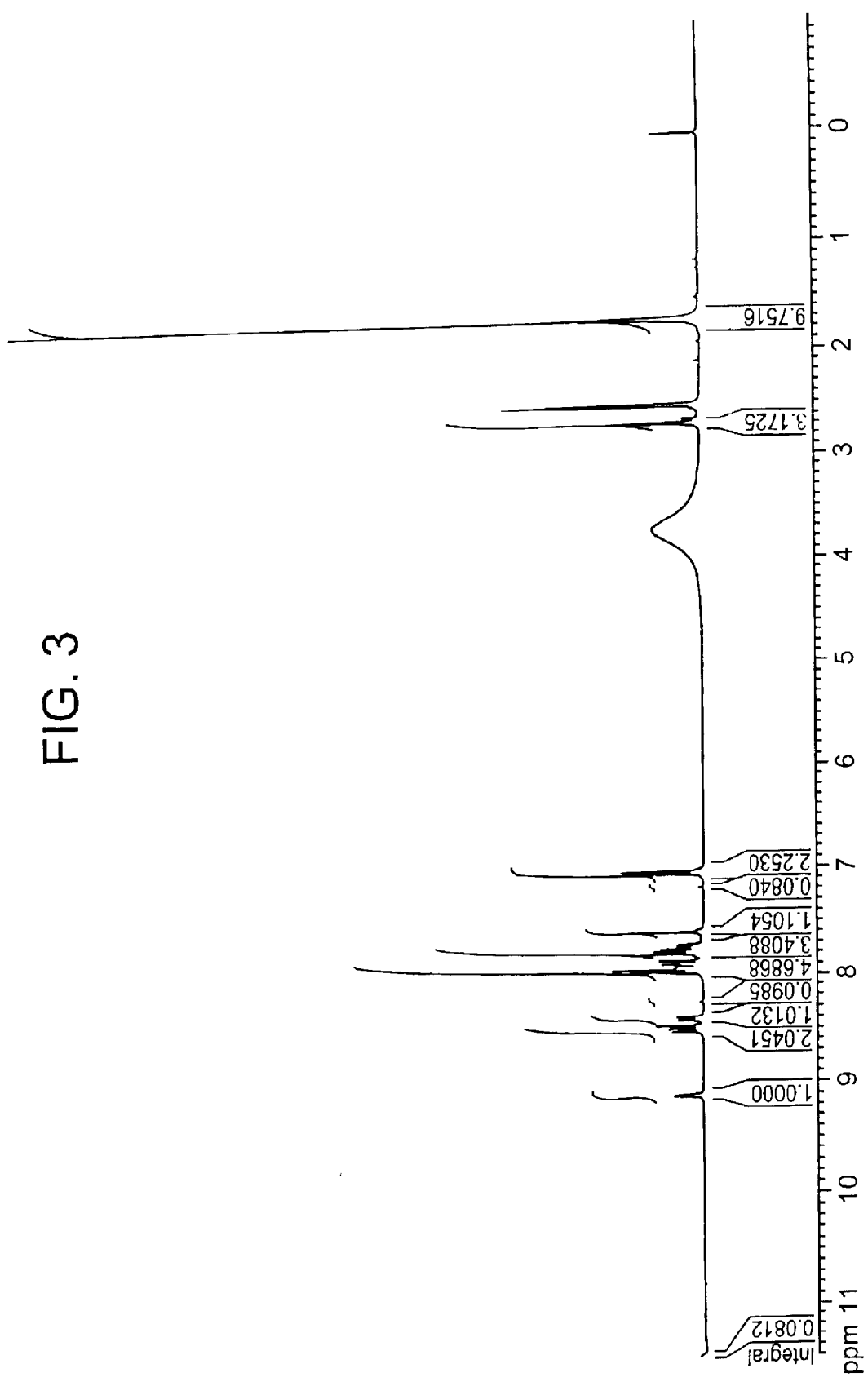
FIG. 3 is a figure showing a measurement result of $^1$HNMR spectrum (300 MHz) of dye II-30 in heavy dimethylsulfoxide.
Figure 4:
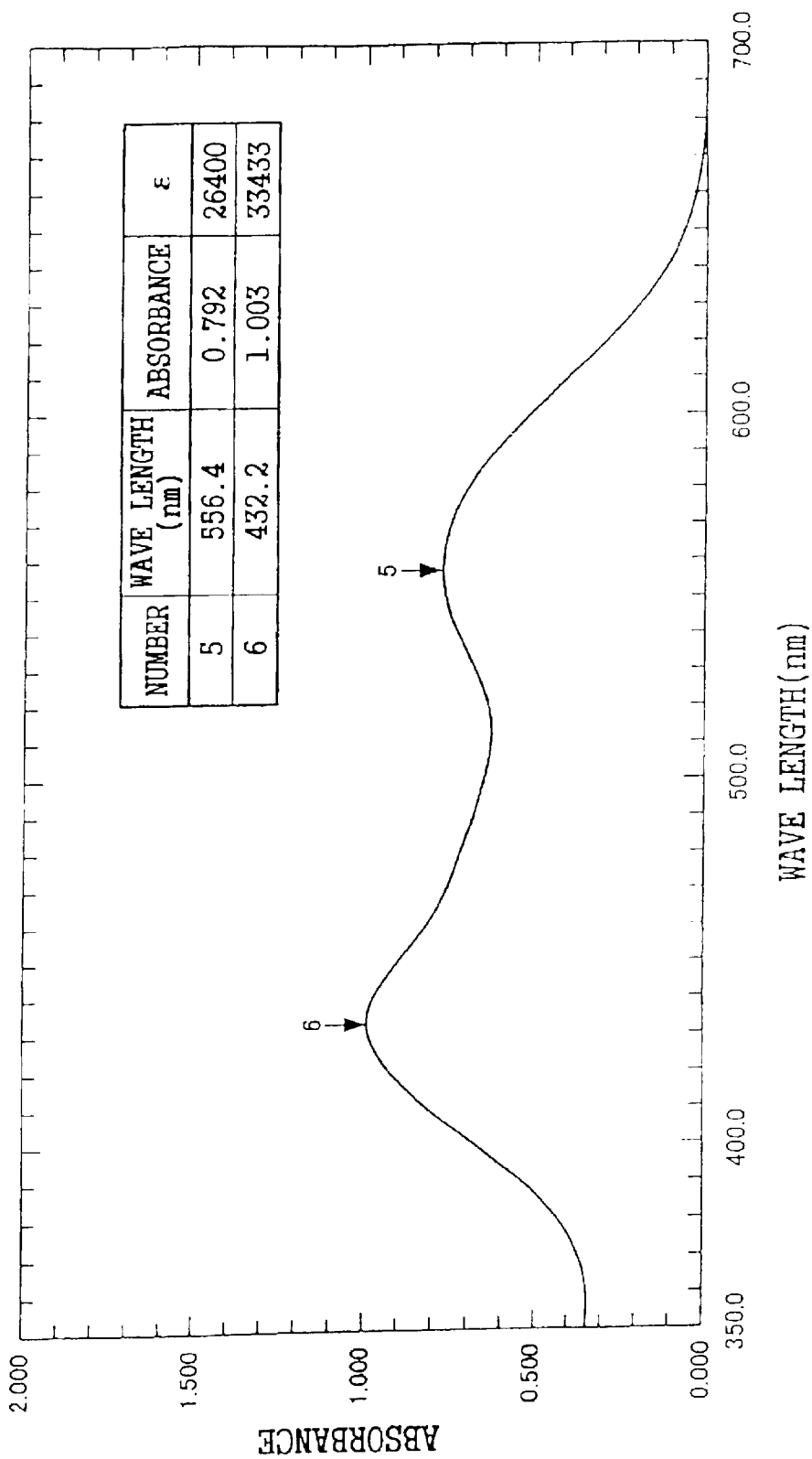
FIG. 4 is a figure showing a measurement result of absorption spectrum of compound II-30 (dye II-30) in dimethylformamide.

The $^1$HNMR spectrum(300 MHz) of the dye II-30 (composition II-30) in heavy dimethylsulfoxide is shown in FIG. 3. The absorption spectrum of the dye. II-30 in dimethylformamide is shown in FIG. 4.

Example 6

[Synthesis of Compound II-29]

A copper chelation of the compound II-30 (dye I-30) was carried out by using copper acetate ($Cu(OCOCH_3)_2$), and the compound II-29 was synthesized.

Figure 5:
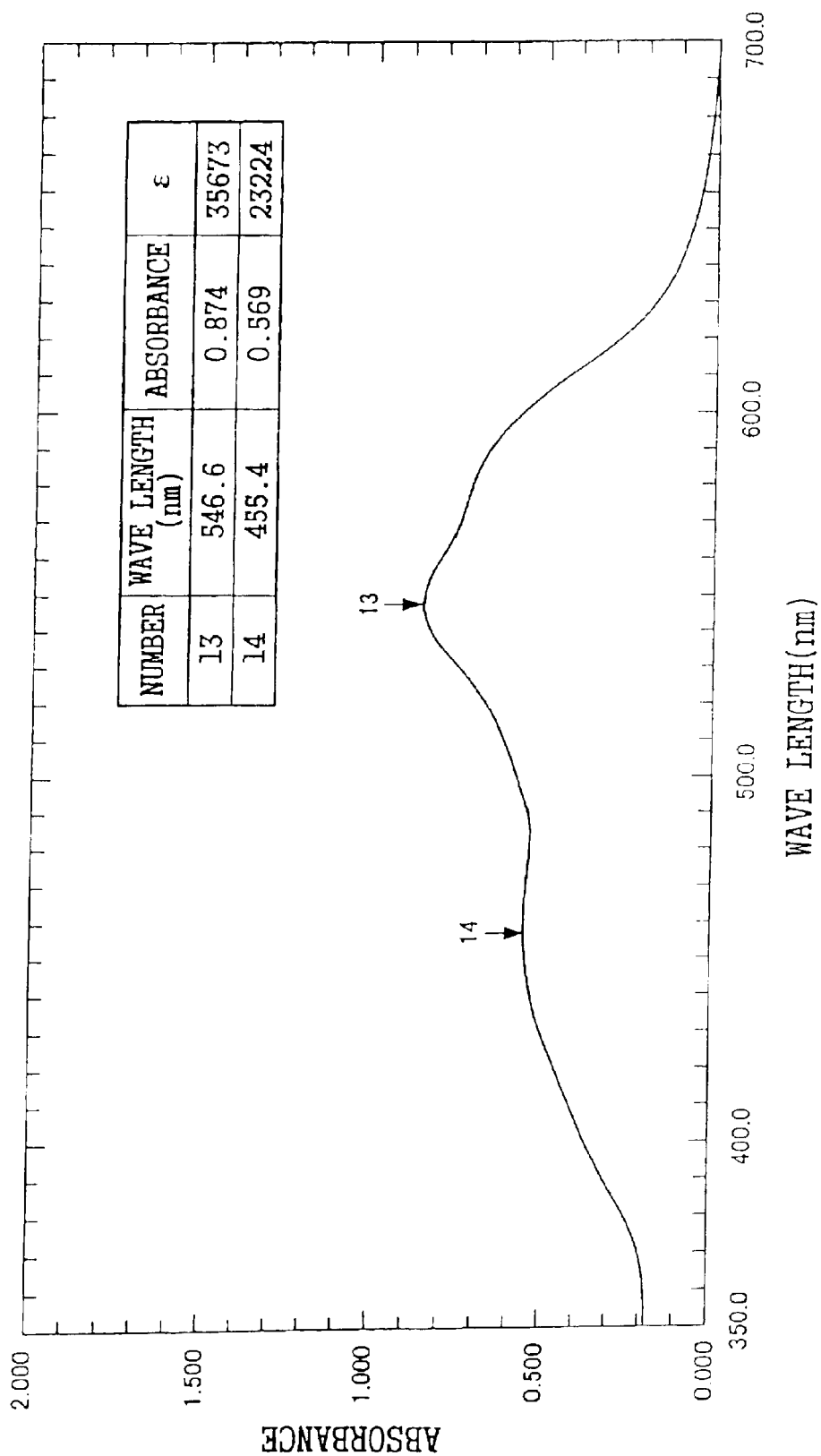
FIG. 5 is a figure showing a measurement result of an absorption spectrum of compound II-29 (dye II-29) in water.

The measurement results of absorption spectrum of the compound II-29 (dye II-29) in water are shown in FIG. 5.

Example 7

[Synthesis of Compound II-31]

The compound II-31 (dye II-31) was synthesized through the following processes. Each of the processes will be described below.

[Synthesis of compound II-31]

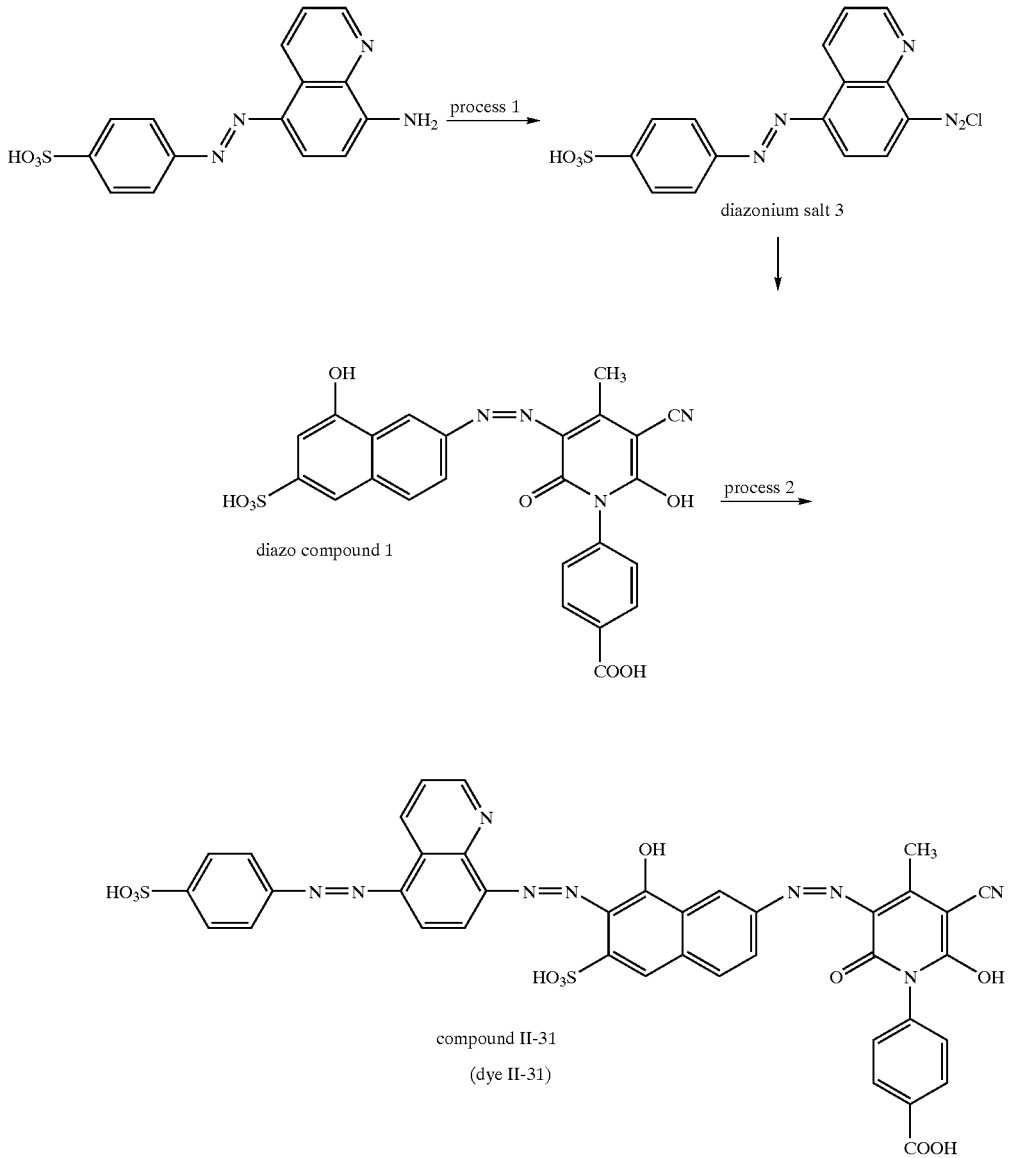

Process 1 (Synthesis of Diazonium Salt 3):

Added to a mixture in which 1.0 g (2.9 mmol) of compound 2 and 10 g of phosphoric acid were being stirred while being cooled, was 0.21 g (3 mmol) of sodium nitrite over five minutes. The resultant mixture was made to react for two hours at 5° C. to prepare diazonium salt 3.

Process 2 (Synthesis of Dye II-31):

Dripped into a mixture in which 0.3 g (0.577 mmol) of azo compound 1, 20 ml of dimethylacetoamide, 10 ml of water and 0.38 g (4.63 mmol) of sodium acetate were being stirred while being cooled, was the diazo liquid of diazonium salt 3 prepared by the process 1 over 15 minutes. The resultant product was made to react for two hours while being cooled, and thereafter, made to stand overnight at room temperatures. As a result, crystals were separated out. 1000 ml of acetonitrile was added to the resultant reaction liquid, and the crystals were filtered. The crude product was refined by using a Sephadex column to obtain 0.28 g of the dye II-31 (compound II-31) (yield: 56%).

Figure 6:
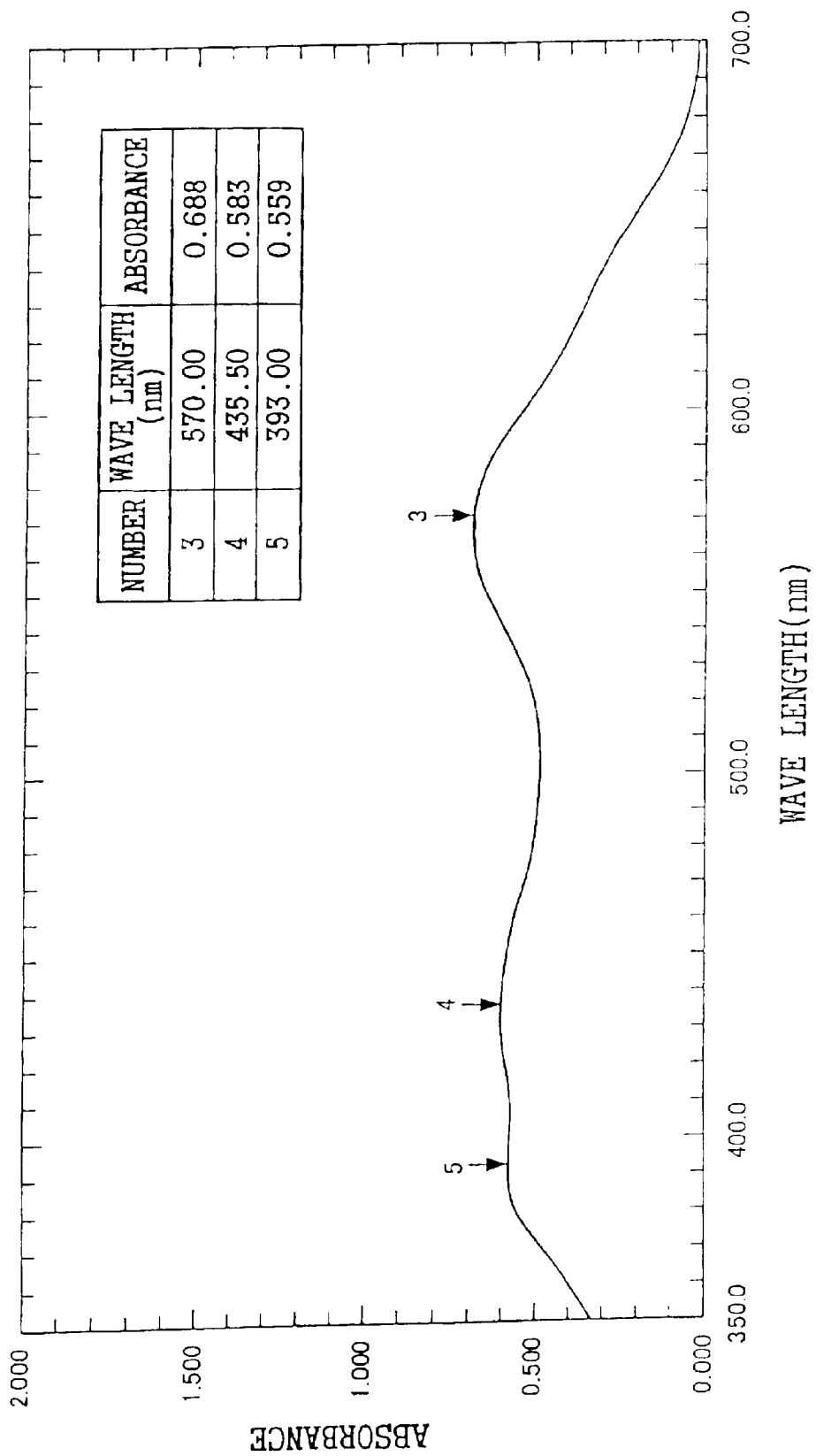
FIG. 6 is a figure showing a measurement result of an absorption spectrum of compound II-31 (dye II-31) in water.
Figure 7:
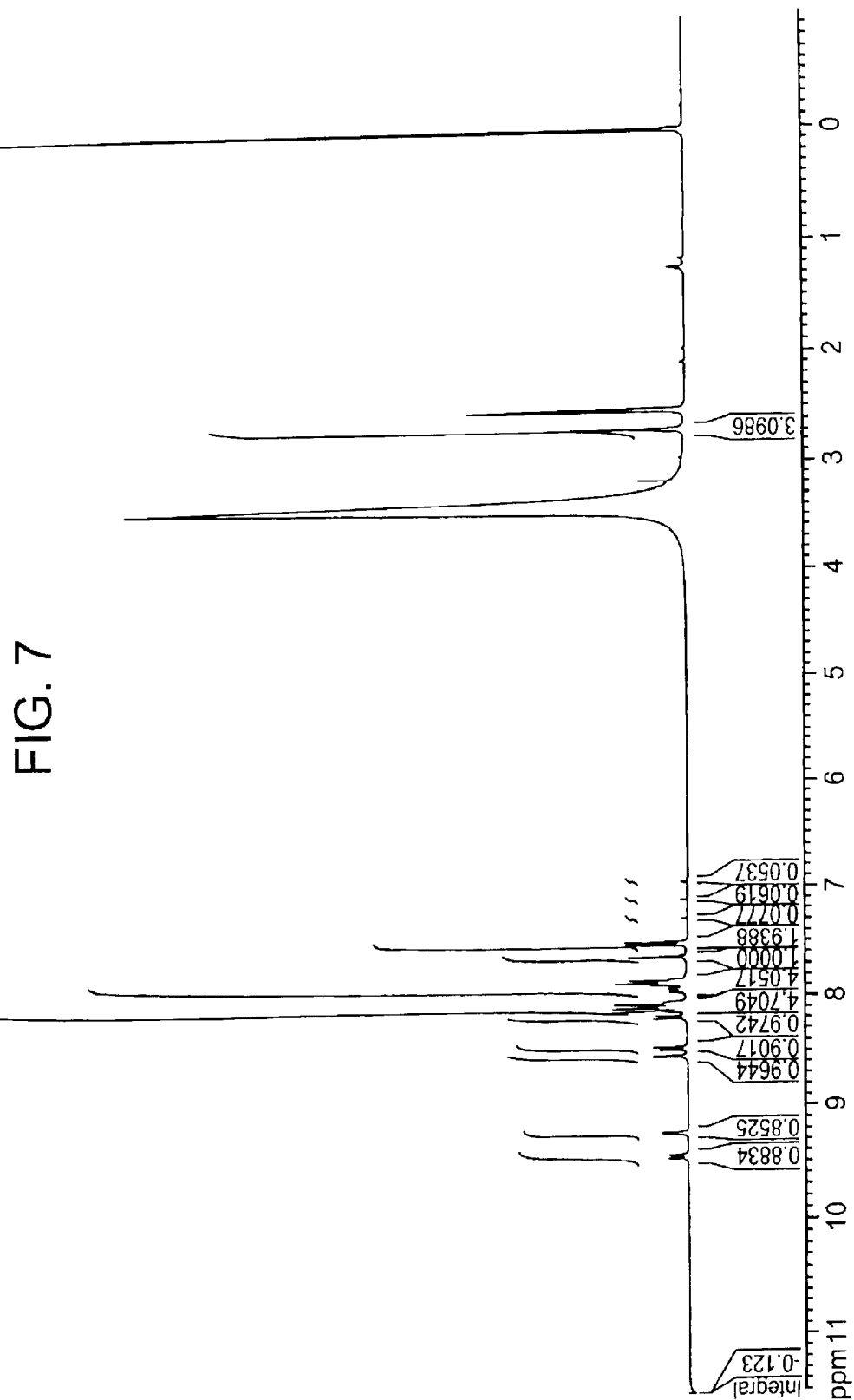
FIG. 7 is a figure showing a measurement result of $^1$HNMR spectrum (300 MHz) of compound II-31 (dye II-31) in heavy dimethylsulfoxide.

The absorption spectrum of the dye II-31 in water is shown in FIG. 6. The $^1$HNMR spectrum(300 MHz) of the dye II-31 in heavy dimethylsulfoxide is shown in FIG. 7.

Example 8

[Synthesis of Compound III-2]

The compound III-2 (dye III-2) as an exemplified compound was synthesized through the following processes. Each of the processes will be described below.

further stirred for 30 minutes, thereby preparing a diazonium liquid.

Process 2:

3.2 g of H acid, 20 ml of methanol and 20 ml of water were stirred while being cooled, and at the same time, the diazonium liquid prepared by the process 1 was added thereto. After stirring for 30 minutes, sodium acetate was added and pH was 8. After further 30 minutes, 1N diluted hydrochloric acid was added and pH was adjusted at 3. Further added to the above mixture was 50 ml of a 20 mass % aqueous solution of sodium chloride, and a separated solid was filtered by suction filtration and an intermediate T was obtained.

Process 3:

Added to a mixture in which 1.0 g of intermediate C and 2.8 ml of concentrated hydrochloric acid were stirred while being cooled, was a solution with 0.5 g of sodium nitrite being dissolved in 2.0 ml of water, and was made to react for 30 minutes, to prepare a diazonium liquid D.

Process 4:

Dripped in a mixture in which the obtained all amounts of intermediate T, 4.0 g of potassium hydroxide, 20 ml of water and 2.0 ml of methanol were stirred while being cooled, was the diazonium liquid of the intermediate D prepared by the process 3. After conducting a reaction for 30 minutes, 20 ml of a sodium chloride aqueous solution were added and concentrated hydrochloric acid were added thereto and pH was adjusted at 3. A separated solid was filtered by suction

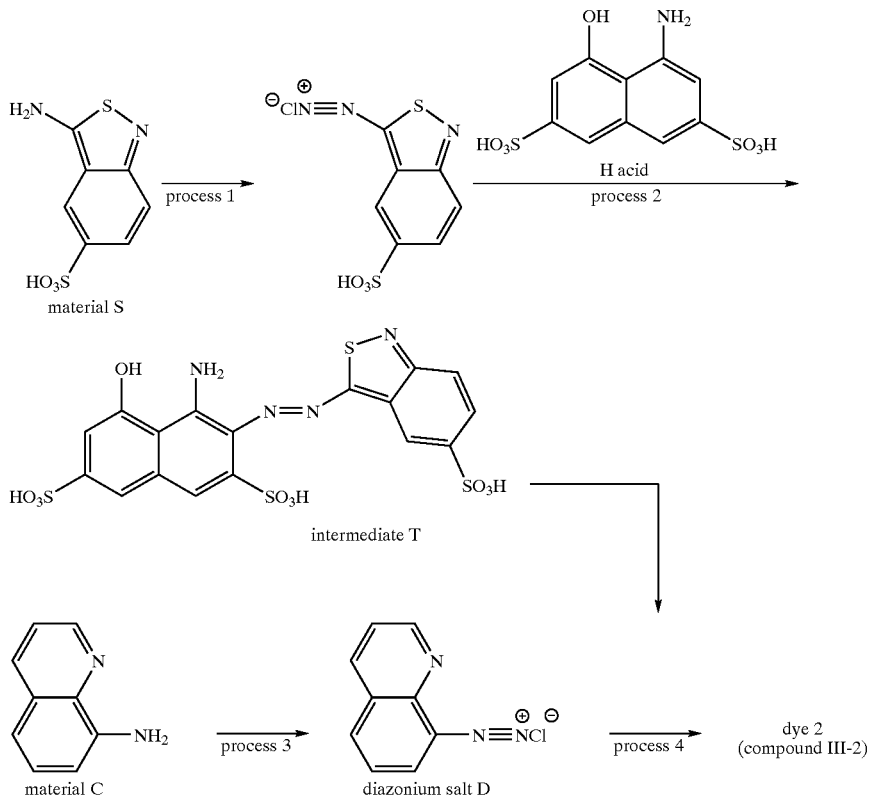

Process 1:

2.3 g (10 mmol) of material S and 5 ml of concentrated hydrochloric acid were stirred while being cooled, and at the same time, a solution with 1.0 g of sodium nitrite being dissolved in 4 ml of water was added thereto, and filtration and dried. Thereafter, the solid was refined by using a Sephadex column and 0.4 g of compound III-2 was obtained.

The mass spectrum of the obtained compound III-2 was measured and structural identification was carried out.

Example 9
[Synthesis of Compound III-26]

The compound III-26 was synthesized through the following processes. Each of the processes will be described below.

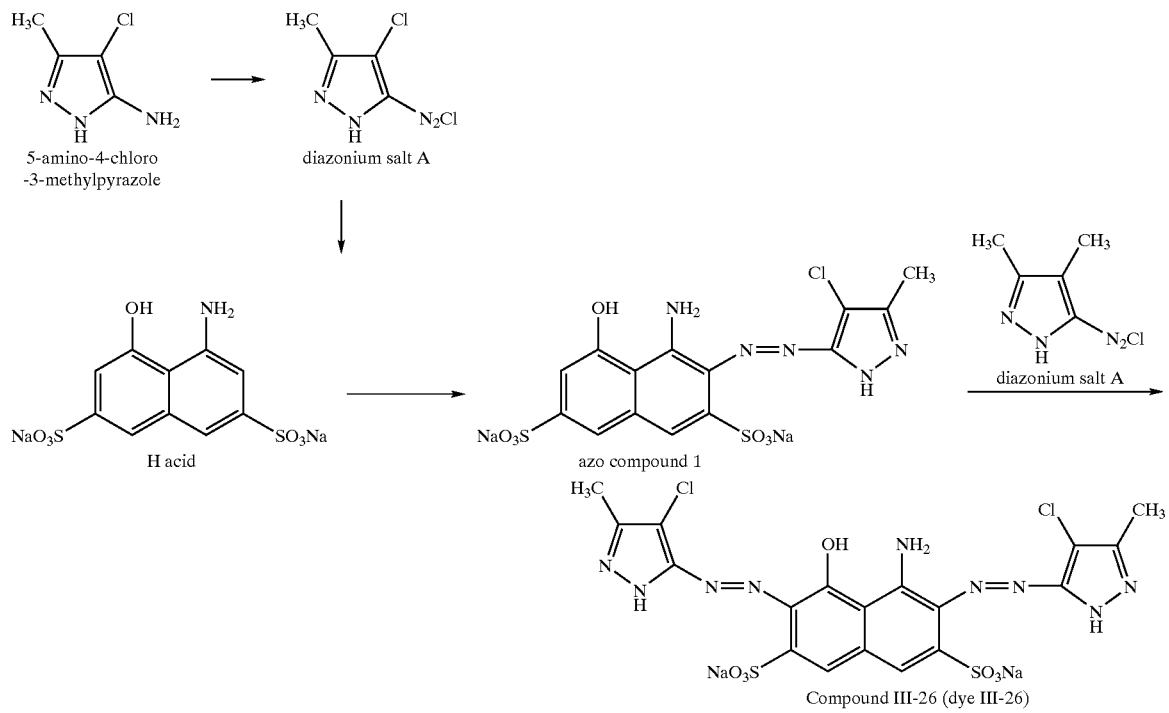

Process 1 (Synthesis of Diazonium Salt A)

3.36 g (2.0 mmol) of 5-amino-4-chloro-3-methylpyrazole, 20 ml of water and 4.3 ml of n-butanol were stirred at room temperatures and dissolved. Thereafter, the mixture was cooled and 4.3 ml of concentrated hydrochloric acid was added thereto. Further, a solution with 2.07 g (3 mmol) of sodium nitrite dissolved in 5 ml of water was dripped in the above mixture over five minutes. The resultant product was made to react for 30 minutes while being cooled, and a diazonium salt A was prepared.

Process 2 (Synthesis of Azo Compound 1 (dye III-26))

3.4 g (10 mmol) of H acid, 160 ml of 0.1M acetic acid aqueous solution and 10 ml of sodium acetate were stirred while being cooled, and at the same time, the diazonium salt A prepared by the process 1 was dripped therein. Thereafter, after the resultant liquid was stirred for 30 minutes while being cooling, 200 ml of acetonitrile was added thereto. A separated solid was filtered. A crude product was refined by a Sephadex column and 3.2 g of dye III-26 was obtained (yield: 49%). FIG. 8 shows an absorption spectrum of II-dye 26 in dimethylformamide.

Example 10
[Production of Ink Sets I-102 to I-124, II-102 to II-127, and III-102 to III-125]

Ink sets I-102 to I-124, II-102 to II-124, and III-102 to III-124 were each produced in the same manner as in a comparative ink set 101 provided in a comparative example 1, which will be describe below, except that a dye used for a black ink was changed to a single compound or mixed compounds of the present invention (in the following tables 2, 3 and 4, the types of compounds of the present invention and the combinations of compounds, which are used in the aforementioned ink sets, are shown and parentheses indicate amounts of addition (g)). An image was formed by these ink sets and evaluated. The results are shown in Tables 5, 6 and 7 below.

Comparative Example 1
[Production of Comparative Ink Set 101 (Common to Ink Sets I, II and III)]

Deionized water was added to the following compositions, resulting in 1 liter as a whole. Thereafter, the mixture was stirred for one hour while being heated at 30 to 40° C. Subsequently, pH was adjusted at 9 with KOH of 10 mol/l, and filtered under reduced pressure through a micro filter having an average pore size of 0.25 µm to prepare a comparative black ink.

| Comparative black ink: | |
|---|---|
| black dye T3 | 20.0 g |
| black dye T5 | 20.0 g |
| black dye T6 | 20.0 g |
| black dye T7 | 20.0 g |
| diethylene glycol | 20 g |
| glycerin | 120 g |
| diethylene glycol monobutyl ether | 230 g |
| 2-pyrolidone | 80 g |
| triethanol amine | 17.9 g |
| benzotriazole | 0.06 g |
| Surfinol TG | 8.5 g |
| PROXEL XL2 | 1.8 g |

Further, due to the compositions in the aforementioned comparative black ink being changed to those described in Table 1 listed below, a light magenta ink, a magenta ink, a light cyan ink, a cyan ink, and a yellow ink were prepared. Thus, the comparative ink set 101 comprised of a plurality of inks shown in Table 1 was produced. An image was formed by using the ink set and evaluated. The results are shown in Tables 5, 6 and 7.

TABLE 1
| | light magenta | magenta | light cyan | cyan | yellow | black |
|---|---|---|---|---|---|---|
| dye | T-1 | T-1 | T-2 | T-2 | T-3 | T-5 |
| | 7.0 | 28.0 | 8.75 | 35.0 | 14.7 | 20.0 |
| | | | | | T-4 | T-6 |
| | | | | | 14.0 | 20.0 |
| | | | | | | T-7 |
| | | | | | | 21.0 |
| | | | | | | T-3 |
| | | | | | | 21.0 |
| diethylene glycol | 150 | 110 | 130 | 200 | 160 | 20 |
| urea | 37 | 46 | — | — | — | — |
| glycerine | 130 | 130 | 150 | 180 | 150 | 120 |
| triethylene glycol monobutyl ether | 130 | 140 | 130 | 140 | 130 | — |
| diethylene glycol monobuyl ether | — | — | — | — | — | 230 |
| 2-pyrolidone | — | — | — | — | — | 80 |
| Surfinol 465 | 12.5 | 1.5 | 11.1 | 9.8 | — | — |
| Surfinol STG | — | — | — | — | 9.0 | 8.5 |
| triethanol amine | 6.9 | 7.4 | 6.8 | 6.7 | 0.8 | 17.9 |
| benzotriazole | 0.08 | 0.07 | 0.08 | 0.08 | 0.06 | 0.06 |
| proxel XL2 | 3.5 | 2.5 | 1.8 | 2.0 | 2.5 | 1.8 |
unit: g/L
T-1
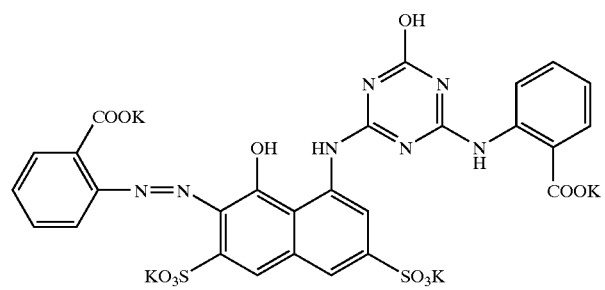
T-2
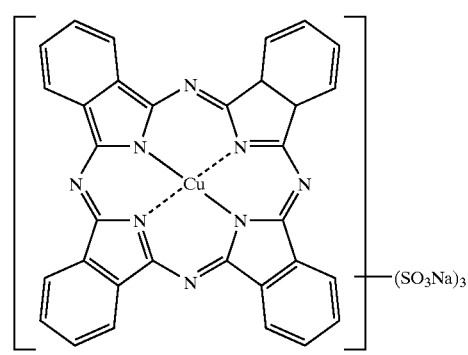
T-3
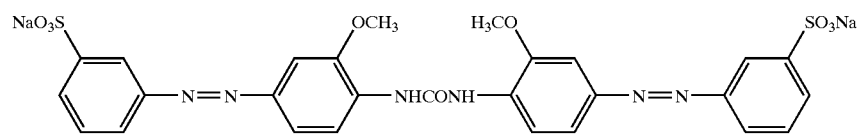
T-4
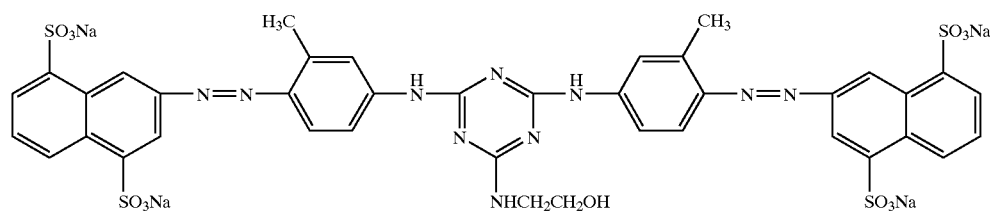

TABLE 1-continued

| | light magenta | magenta | light cyan | cyan | yellow | black |
|---|---|---|---|---|---|---|

T-5

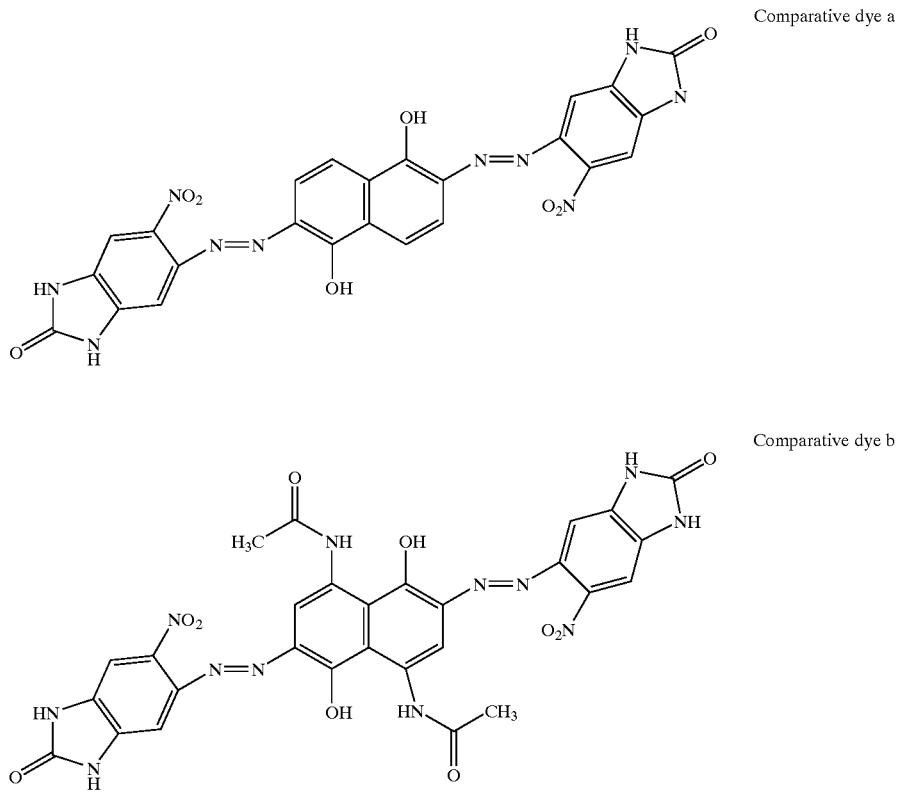

T-6

T-7

Comparative Example 2
[Production of Comparative Ink Sets 129 to 132]

Comparative ink sets 129 to 132 were produced as in the above comparative ink set 101 except that the dye used for a black ink was changed to the following comparative dyes a, b and c and was used for comparison (in the following tables 2, 3 and 4, the kinds of comparative dyes, combinations of dyes, and amounts of addition thereof are shown). An image was formed by using these ink sets and evaluated. The results are shown in Tables 5, 6 and 7.

Comparative dye a

Comparative dye b

-continued

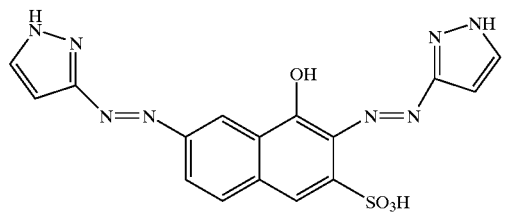

Comparative dye c

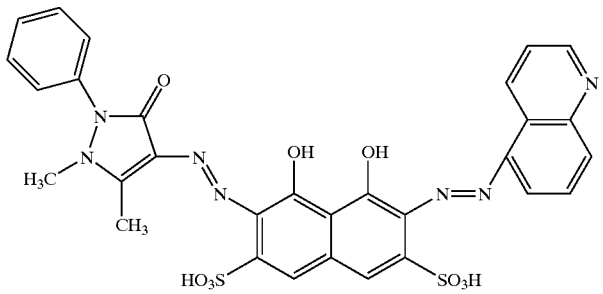

Comparative dye d

TABLE 2

| ink set | used dye (compound) (amount of addition: g) | remarks |
|---|---|---|
| 101 | T3(20), T5(20), T6(20), T7(20) | Comparative example |
| I-102 | I-1(80) | Present invention |
| I-103 | I-2(80) | Present invention |
| I-104 | I-3(80) | Present invention |
| I-105 | I-4(80) | Present invention |
| I-106 | I-6(80) | Present invention |
| I-107 | I-7(80) | Present invention |
| I-108 | I-8(80) | Present invention |
| I-109 | I-10(80) | Present invention |
| I-110 | I-16(80) | Present invention |
| I-111 | I-17(80) | Present invention |
| I-112 | I-20(80) | Present invention |
| I-113 | I-21(80) | Present invention |
| I-114 | I-23(80) | Present invention |
| I-115 | I-24(80) | Present invention |
| I-116 | I-25(80) | Present invention |
| I-117 | I-27(80) | Present invention |
| I-118 | I-28(80) | Present invention |
| I-119 | I-1(20), I-2(20), I-23(40) | Present invention |
| I-120 | I-4(20), I-6(20), I-24(40) | Present invention |
| I-121 | I-8(20), I-10(20), I-23(40) | Present invention |
| I-122 | I-16(29), I-17(30), I-25(30) | Present invention |
| I-123 | I-1(20), I-17(30), I-25(30) | Present invention |
| I-124 | I-3(20), I-23(30), I-25(30) | Present invention |
| 129 | a(80) | Comparative example |
| 130 | b(80) | Comparative example |
| 131 | c(80) | Comparative example |
| 132 | d(80) | Comparative example |

TABLE 3

| ink set | used dye (compound) (amount of addition: g) | remarks: |
|---|---|---|
| 101 | T3(20), T5(20), T6(20), T7(20) | Comparative example |
| II-102 | II-1(80) | Present invention |
| II-103 | II-2(80) | Present invention |
| II-104 | II-3(80) | Present invention |
| II-105 | II-4(80) | Present invention |
| II-106 | II-6(80) | Present invention |
| II-107 | II-7(80) | Present invention |
| II-108 | II-8(80) | Present invention |
| II-109 | II-10(80) | Present invention |
| II-110 | II-16(80) | Present invention |

TABLE 3-continued

| ink set | used dye (compound) (amount of addition: g) | remarks: |
|---|---|---|
| II-111 | II-17(80) | Present invention |
| II-112 | II-20(80) | Present invention |
| II-113 | II-21(80) | Present invention |
| II-114 | II-23(80) | Present invention |
| II-115 | II-24(80) | Present invention |
| II-116 | II-25(80) | Present invention |
| II-117 | II-27(80) | Present invention |
| II-118 | II-28(80) | Present invention |
| II-119 | II-1(20), II-2(20), II-23(40) | Present invention |
| II-120 | II-4(20), II-6(20), II-24(40) | Present invention |
| II-121 | II-8(20), II-10(20), II-23(40) | Present invention |
| II-122 | II-16(29), II-17(30), II-25(30) | Present invention |
| II-123 | II-1(20), II-17(30), II-25(30) | Present invention |
| II-124 | II-3(20), II-23(30), II-25(30) | Present invention |
| II-125 | II-29(80) | Present invention |
| II-126 | II-30(80) | Present invention |
| II-127 | II-31(80) | Present invention |
| 129 | a(80) | Comparative example |
| 130 | b(80) | Comparative example |
| 131 | c(80) | Comparative example |
| 132 | d(80) | Comparative example |

TABLE 4

| ink set | used dye (compound) (amount of addition: g) | remarks: |
|---|---|---|
| 101 | T3(20), T5(20), T6(20), T7(20) | Comparative example |
| III-102 | III-1(80) | Present invention |
| III-103 | III-2(80) | Present invention |
| III-104 | III-3(80) | Present invention |
| III-105 | III-4(80) | Present invention |
| III-106 | III-5(80) | Present invention |
| III-107 | III-6(80) | Present invention |
| III-108 | III-7(80) | Present invention |
| III-109 | III-8(80) | Present invention |
| III-110 | III-9(80) | Present invention |
| III-111 | III-10(80) | Present invention |
| III-112 | III-11(40), III-2(40) | Present invention |
| III-113 | III-12(40), III-3(40) | Present invention |
| III-114 | III-13(40), III-4(40) | Present invention |
| III-115 | III-14(20), III-2(20), III-21(40) | Present invention |
| III-116 | III-15(20), III-2(20), III-22(40) | Present invention |

TABLE 4-continued

| ink set | used dye (compound) (amount of addition: g) | remarks: |
|---|---|---|
| III-117 | III-16(20), III-4(30), III-6(30) | Present invention |
| III-118 | III-17(20), III-5(30), III-1(30) | Present invention |
| III-119 | III-18(20), III-8(30), III-2(30) | Present invention |
| III-120 | III-19(20), III-9(30), III-3(30) | Present invention |
| III-121 | III-20(20), III-10(30), III-4(30) | Present invention |
| III-122 | III-21(20), III-11(30), III-5(30) | Present invention |
| III-123 | III-22(20), III-11(30), III-6(30) | Present invention |
| III-124 | III-23(20), III-2(60) | Present invention |
| III-125 | III-26(80) | Present invention |
| 129 | a(80) | Comparative example |
| 130 | b(80) | Comparative example |
| 131 | c(80) | Comparative example |
| 132 | d(80) | Comparative example |

TABLE 5

| ink set | color tone | dependency of color tone on paper | water resistance | light resistance | dark heat storability | ozone resistance | remarks |
|---|---|---|---|---|---|---|---|
| 101 | ○ | ○ | ○ | C | B | C | Com. ex. |
| I-102 | ○ | ○ | ○ | A | A | A | Present invention |
| I-103 | ○ | ○ | ○ | A | A | A | Present invention |
| I-104 | ○ | ○ | ○ | A | A | A | Present invention |
| I-105 | ○ | ○ | ○ | A | A | A | Present invention |
| I-106 | ○ | ○ | ○ | A | A | A | Present invention |
| I-107 | ○ | ○ | ○ | A | A | A | Present invention |
| I-108 | ○ | ○ | ○ | A | A | A | Present invention |
| I-109 | ○ | ○ | ○ | A | A | A | Present invention |
| I-110 | ○ | ○ | ○ | A | A | A | Present invention |
| I-111 | ○ | ○ | ○ | A | A | A | Present invention |
| I-112 | ○ | ○ | ○ | A | A | A | Present invention |
| I-113 | ○ | ○ | ○ | A | A | A | Present invention |
| I-114 | ○ | ○ | ○ | A | A | A | Present invention |
| I-115 | ○ | ○ | ○ | A | A | A | Present invention |
| I-116 | ○ | ○ | ○ | A | A | A | Present invention |
| I-117 | ○ | ○ | ○ | A | A | A | Present invention |
| I-118 | ○ | ○ | ○ | A | A | A | Present invention |
| I-119 | ○ | ○ | ○ | A | A | A | Present invention |
| I-120 | ○ | ○ | ○ | A | A | A | Present invention |
| I-121 | ○ | ○ | ○ | A | A | A | Present invention |
| I-122 | ○ | ○ | ○ | A | A | A | Present invention |
| I-123 | ○ | ○ | ○ | A | A | A | Present invention |
| I-124 | ○ | ○ | ○ | A | A | A | Present invention |
| 129 | X | ○ | ○ | B | A | B | Com. ex. |
| 130 | X | ○ | ○ | B | B | B | Com. ex. |
| 131 | X | ○ | ○ | B | A | A | Com. ex. |
| 132 | X | X | ○ | B | A | A | Com. ex. |

TABLE 6

| ink set | color tone | dependency of color tone on paper | water resistance | light resistance | dark heat storability | ozone resistance | remarks |
|---|---|---|---|---|---|---|---|
| 101 | ○ | ○ | ○ | C | B | C | Com. ex. |
| II-102 | ○ | ○ | ○ | A | A | A | Present invention |
| II-103 | ○ | ○ | ○ | A | A | A | Present invention |
| II-104 | ○ | ○ | ○ | A | A | A | Present invention |
| II-105 | ○ | ○ | ○ | A | A | A | Present invention |
| II-106 | ○ | ○ | ○ | A | A | A | Present invention |
| II-107 | ○ | ○ | ○ | A | A | A | Present invention |
| II-108 | ○ | ○ | ○ | A | A | A | Present invention |
| II-109 | ○ | ○ | ○ | A | A | A | Present invention |
| II-110 | ○ | ○ | ○ | A | A | A | Present invention |
| II-111 | ○ | ○ | ○ | A | A | A | Present invention |
| II-112 | ○ | ○ | ○ | A | A | A | Present invention |
| II-113 | ○ | ○ | ○ | A | A | A | Present invention |
| II-114 | ○ | ○ | ○ | A | A | A | Present invention |
| II-115 | ○ | ○ | ○ | A | A | A | Present invention |
| II-116 | ○ | ○ | ○ | A | A | A | Present invention |
| II-117 | ○ | ○ | ○ | A | A | A | Present invention |
| II-118 | ○ | ○ | ○ | A | A | A | Present invention |
| II-119 | ○ | ○ | ○ | A | A | A | Present invention |
| II-120 | ○ | ○ | ○ | A | A | A | Present invention |
| II-121 | ○ | ○ | ○ | A | A | A | Present invention |
| II-122 | ○ | ○ | ○ | A | A | A | Present invention |
| II-123 | ○ | ○ | ○ | A | A | A | Present invention |
| II-124 | ○ | ○ | ○ | A | A | A | Present invention |
| 125 | ○ | ○ | ○ | A | A | A | Present invention |
| 126 | ○ | ○ | ○ | A | A | A | Present invention |
| 127 | ○ | ○ | ○ | A | A | A | Present invention |
| 129 | X | ○ | ○ | B | A | A | Com. ex. |
| 130 | X | ○ | ○ | B | B | B | Com. ex. |
| 131 | X | ○ | ○ | B | A | A | Com. ex. |
| 132 | X | X | ○ | B | A | A | Com. ex. |

TABLE 7

| ink set | color tone | dependency of color tone on paper | water resistance | light resistance | dark heat storability | Ozone resistance | remarks |
|---|---|---|---|---|---|---|---|
| 101 | ○ | ○ | ○ | C | B | C | Com. ex. |
| III-102 | ○ | ○ | ○ | A | A | A | Present invention |
| III-103 | ○ | ○ | ○ | A | A | A | Present invention |

TABLE 7-continued

| ink set | color tone | dependency of color tone on paper | water resistance | light resistance | dark heat storability | Ozone resistance | remarks |
|---|---|---|---|---|---|---|---|
| III-104 | ○ | ○ | ○ | A | A | A | Present invention |
| III-105 | ○ | ○ | ○ | A | A | A | Present invention |
| III-106 | ○ | ○ | ○ | A | A | A | Present invention |
| III-107 | ○ | ○ | ○ | A | A | A | Present invention |
| III-108 | ○ | ○ | ○ | A | A | A | Present invention |
| III-109 | ○ | ○ | ○ | A | A | A | Present invention |
| III-110 | ○ | ○ | ○ | A | A | A | Present invention |
| III-111 | ○ | ○ | ○ | A | A | A | Present invention |
| III-112 | ○ | ○ | ○ | A | A | A | Present invention |
| III-113 | ○ | ○ | ○ | A | A | A | Present invention |
| III-114 | ○ | ○ | ○ | A | A | A | Present invention |
| III-115 | ○ | ○ | ○ | A | A | A | Present invention |
| III-116 | ○ | ○ | ○ | A | A | A | Present invention |
| III-117 | ○ | ○ | ○ | A | A | A | Present invention |
| III-118 | ○ | ○ | ○ | A | A | A | Present invention |
| III-119 | ○ | ○ | ○ | A | A | A | Present invention |
| III-120 | ○ | ○ | ○ | A | A | A | Present invention |
| III-121 | ○ | ○ | ○ | A | A | A | Present invention |
| III-122 | ○ | ○ | ○ | A | A | A | Present invention |
| III-123 | ○ | ○ | ○ | A | A | A | Present invention |
| III-124 | ○ | ○ | ○ | A | A | A | Present invention |
| 125 | ○ | ○ | ○ | A | A | A | Present invention |
| 129 | X | ○ | ○ | B | A | A | Com. ex. |
| 130 | X | ○ | ○ | B | B | B | Com. ex. |
| 131 | X | ○ | ○ | B | A | A | Com. ex. |
| 132 | X | X | ○ | B | A | A | Com. ex. |

[Formation and Evaluation of Recorded Image]

The aforementioned ink sets were each filled in a cartridge of an ink-jet printer (PM670C, manufactured by Seiko-Epson Co., Ltd.) and an image was formed on photo-gloss paper (Ink-jet paper (super photo grade), manufactured by Fuji Photo Film Co., Ltd.) by means of the printer. Thereafter, each recorded image was evaluated as described below. The evaluation results are shown in the tables 5, 6 and 7 shown above.

[Evaluation of Color Tone]

The color tone was evaluated with a black portion of an image recorded on the photo-gloss paper being observed, and classified into two grades, namely, ○ (preferred) and X (unpreferred): "○" indicates that the black portion is included in a region having a preferred black hue, and "X" indicates that the black portion is included in a region having an unpreferred black hue.

[Evaluation of Dependency on Paper]

The dependency of an image on paper was evaluated with each color tone of an image formed on the photo-gloss paper and an image formed on high quality paper for PPC being observed, and classified into two grades, namely, ○ (good) and X (poor): "○" indicates that the difference in color tone between the images is small, and "X" indicates that the difference in color tone between the images is large.

[Evaluation of Water Resistance]

The water resistance was evaluated with bleeding caused in an obtained image, which was air-dried and further immersed in deionized water for 10 seconds, being observed, and was classified into two grades, namely, ○ (good) and X (poor): "○" indicates that no bleeding occurs, and "X" indicates that bleeding occurs.

As the evaluation of image storability, a printing sample was prepared, and light resistance, dark heat storability and ozone resistance of the sample were evaluated as described below.

[Evaluation of Light Resistance]

The light resistance was estimated in such a manner that the image density Ci immediately after printing was measured by means of X-rite 310, and thereafter, exposed to xenon light (85,000 lux) by means of a weather meter manufactured by Atlas for seven days. Subsequently, the image density Cf was measured again and the ratios of residual dye Ci/Cf*100 were obtained.

The ratios of residual dye were evaluated at the points where the reflection density had been 1, 1.5 and 2.0. In accordance with the ratios of residual dye, each ink was classified into the following three grades.

A: the ratios at all the points were not less than 70%,
B: the ratios at two points were less than 70%, and
C: the ratios at all points were less than 70%.

[Evaluation of Dark Heat Storability]

The dark heat storability was estimated with, before and after a sample was preserved for seven days under the condition of 80° C.-15% RH, the image density of the sample being measured by means of X-rite 310, and the ratios of residual dye were obtained.

The ratios of residual dye were evaluated at the points where the reflection density had been 1, 1.5 and 2.0. In accordance with the ratios of residual dye, each ink was classified into the following three grades.

A: the ratios at all the points were not less than 90%,
B: the ratios at two points were less than 90%, and
C: the ratios at all points were less than 90%.

[Evaluation of Zone Resistance]

The ozone resistance was estimated with, before and after a sample was preserved for 24 hours in a dark room at room temperatures with an ozone gas concentration of 0.5±0.1 ppm, the image density of the sample being measured by means of X-rite 310 and the ratios of residual dye were obtained.

The ratios of residual dye were evaluated at the points where the reflection density had been 1, 1.5 and 2.0. In accordance with the ratios of residual dye, each ink was classified into the following three grades.

A: the ratios at all the points were not less than 70%,
B: the ratios at two points were less than 70%, and
C: the ratios at all points were less than 70%.

It was confirmed from the evaluation results shown in Tables 5, 6 and 7 that the sample 101 in which publicly known black dyes T3, T5, T6 and T7 were mixed together was inferior in ozone resistance and heat resistance, and the samples 129 to 132 in which publicly known dyes a, b and c were used each did not present a black color. On the other hand, it was confirmed that the samples I-102 to I-124, II-102 to II-127 and III-102 to III-125 in which the compounds of the present invention were used each present a high-density and neutral black color and have excellent fastness in various conditions as the result of a printing test. That is, it became clear that the inks of the examples in which the compounds of the present invention were used each have excellent printing properties, excellent color tone, a low dependency on paper, excellent water resistance with no occurrence of bleeding, and further excellent in image storability such as light resistance, dark heat storability and ozone resistance.

Example 11

The same ink as that produced by Examples 1 to 9 was charged in a cartridge of an ink jet printer BJ-F850 (manufactured by CANON), and an image to be recorded was recorded by means of the ink jet printer on ink-jet photo-gloss paper EX (manufactured by Fuji Photo Film Co., Ltd.) and evaluated in the same manner as in Example 1, and the same results as those of Example 1 were obtained.

In the present invention, first, an improved compound can be provided, which presents a high-density and neutral black color, satisfies various conditions required by dye, ink and jet-printing ink, allows a low production cost and easy synthesization. Secondly, improved composition, ink, jet-printing ink containing the aforementioned improved dye, which have excellent printing properties, excellent color tone and a low dependency on paper, cause no bleeding, have excellent water resistance and excellent image storability such as light resistance, dark heat preservability and ozone resistance, and present a high density black color. Thirdly, an ink-jet recording method can be provided in which a black image having excellent image properties is obtained by means of the aforementioned jet-printing ink.

What is claimed is:

1. An ink which comprises a dye which comprises at least one of a compound represented by the following general formula (III):

General formula (III)

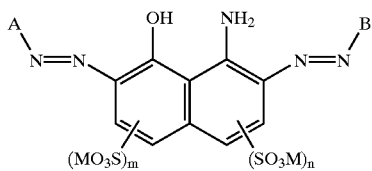

wherein, A and B each independently represents a monovalent heterocyclic group bonded to an azo group by a carbon atom of the monovalent heterocyclic group; m and n each independently represents one of 0 and 1; and M represents one of a hydrogen atom and a monovalent positive ion.

2. The ink of claim 1, which comprises the dye in the range of 0.5 to 20 mass % based on the total mass of the ink.

3. An ink-jet recording method which comprises a step of recording, using the ink of claim 1.

4. A compound represented by the following general formula (III):

General formula (III)

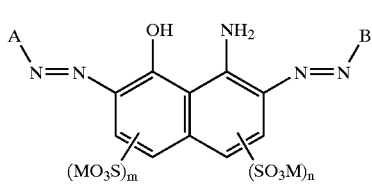

wherein A represents one of the following groups (A-I), (A-II), (A-III), (A-IV), (A-V) or to (A-VII); B represents a monovalent heterocyclic group bonded to an azo group by a carbon atom of the monovalent heterocyclic group; m and n each independently represents one of 0 and 1; and M represents one of a hydrogen atom and a monovalent positive ion:

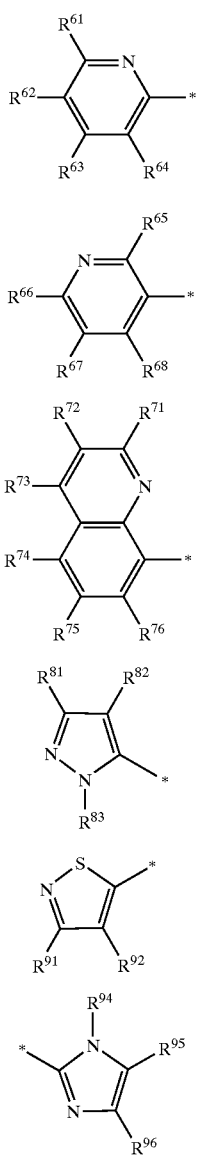 (A-I)

(A-II)

(A-III)

(A-IV)

(A-V)

(A-VII)

wherein $R^{61}$, $R^{62}$, $R^{63}$, $R^{64}$, $R^{65}$, $R^{66}$, $R^{67}$, $R^{68}$, $R^{71}$, $R^{72}$, $R^{73}$, $R^{74}$, $R^{75}$, $R^{76}$, $R^{81}$, $R^{82}$, $R^{83}$, $R^{91}$, $R^{92}$, $R^{94}$, $R^{95}$ and $R^{96}$ each independently represents a hydrogen atom or a substituent.

5. A compound represented by the following general formula (III):

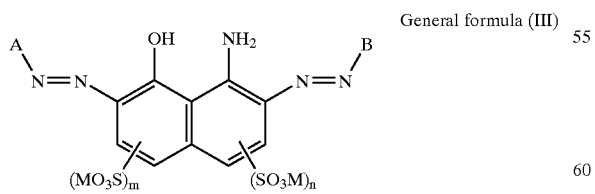

General formula (III)

wherein A represents a monovalent heterocyclic group bonded to an azo group by a carbon atom of the monovalent heterocyclic group; B represents one of the following groups (B-I) to (B-VII); m and n each independently represents one of 0 and 1; and M represents one of a hydrogen atom and a monovalent positive ion:

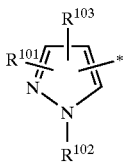 (B-I)

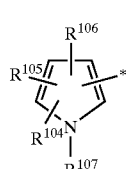 (B-II)

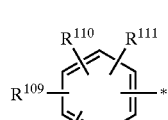 (B-III)

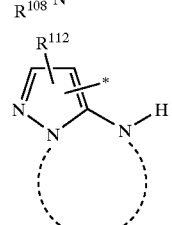 (B-IV)

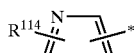 (B-V)

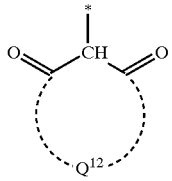 (B-VI)

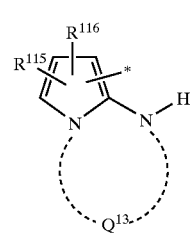 (B-VII)

wherein $R^{101}$, $R^{102}$, $R^{103}$, $R^{104}$, $R^{105}$, $R^{106}$, $R^{107}$, $R^{108}$, $R^{109}$, $R^{110}$, $R^{111}$, $R^{112}$, $R^{113}$, $R^{114}$, $R^{115}$, $R^{116}$ each independently represents a hydrogen atom or a substituent, and $Q^{11}$, $Q^{12}$ and $Q^{13}$ each represents an atomic group of atoms which are required for forming a 5- or 6-membered heterocyclic ring.

* * * * *